US012366286B2

(12) United States Patent
Okazaki et al.

(10) Patent No.: US 12,366,286 B2
(45) Date of Patent: Jul. 22, 2025

(54) POWER TRANSMISSION MECHANISM AND WORKING VEHICLE

(71) Applicant: KUBOTA CORPORATION, Osaka (JP)

(72) Inventors: Kazuto Okazaki, Osaka (JP); Shigeki Hayashi, Osaka (JP); Shinichi Kawabata, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 84 days.

(21) Appl. No.: 18/195,544

(22) Filed: May 10, 2023

(65) Prior Publication Data

US 2023/0313870 A1 Oct. 5, 2023

Related U.S. Application Data

(63) Continuation of application No. PCT/JP2021/040808, filed on Nov. 5, 2021.

(30) Foreign Application Priority Data

Nov. 11, 2020 (JP) ................................. 2020-188105
Nov. 11, 2020 (JP) ................................. 2020-188106
Nov. 11, 2020 (JP) ................................. 2020-188107

(51) Int. Cl.
F16H 37/06 (2006.01)
B60K 1/02 (2006.01)
(Continued)

(52) U.S. Cl.
CPC .............. *F16H 37/065* (2013.01); *B60K 1/02* (2013.01); *B60K 17/28* (2013.01); *B62D 49/06* (2013.01)

(58) Field of Classification Search
CPC ......... F16H 37/065; B60K 1/02; B60K 17/28; B60K 25/06; B62D 49/06; H02K 7/116
See application file for complete search history.

(56) References Cited

U.S. PATENT DOCUMENTS 5,309,778 A    5/1994  Roumen
5,310,387 A *  5/1994  Savagian ................. F16H 3/72
                                                              475/8

(Continued)

FOREIGN PATENT DOCUMENTS

EP    3312035 A1 *  4/2018  ............... B60K 1/02
JP    2894760 B2    5/1999
(Continued)

OTHER PUBLICATIONS

Di et al., WO-2017050102-A1, Machine Translation of Specification (Year: 2017).*

(Continued)

*Primary Examiner* — Paul N Dickson
*Assistant Examiner* — Matthew Joseph Ganci
(74) *Attorney, Agent, or Firm* — Greenblum & Bernstein, P.L.C.

(57) ABSTRACT

A power transmission mechanism includes a first motor, a second motor, a first input shaft to which power is transmitted from the first motor, a second input shaft to which power is transmitted from the second motor, a first output shaft to transmit power to a first driven portion, a second output shaft to transmit power to a second driven portion, and a transmission mechanism which includes a planetary gear mechanism to receive power from the first input shaft and from the second input shaft, and is operable to send power from the first input shaft and from the second input shaft to the first output shaft and the second output shaft.

20 Claims, 9 Drawing Sheets

(51) Int. Cl.
*B60K 17/28* (2006.01)
*B62D 49/06* (2006.01)

(56) References Cited

U.S. PATENT DOCUMENTS

| | | | |
|---|---|---|---|
| 2007/0265128 A1* | 11/2007 | Conlon | F16H 3/727 |
| | | | 475/5 |
| 2009/0301799 A1 | 12/2009 | Tarasinski et al. | |
| 2013/0006460 A1 | 1/2013 | Endo et al. | |
| 2015/0024894 A1* | 1/2015 | Lee | F16H 3/728 |
| | | | 475/5 |
| 2015/0292600 A1* | 10/2015 | Ai | B60K 6/445 |
| | | | 475/5 |
| 2019/0000012 A1 | 1/2019 | Yagyu et al. | |
| 2020/0130693 A1 | 4/2020 | Yagyu et al. | |

FOREIGN PATENT DOCUMENTS

| | | | | |
|---|---|---|---|---|
| JP | 2003136970 A | 5/2003 | | |
| JP | 2006311784 A | 11/2006 | | |
| JP | 2012257363 A | 12/2012 | | |
| JP | 5826042 | 12/2015 | | |
| JP | 2020500764 A | 1/2020 | | |
| WO | WO-2017050102 A1 * | 3/2017 | ............... | B60K 1/02 |
| WO | 2018/102498 A1 | 6/2018 | | |
| WO | 2019/003712 A1 | 1/2019 | | |

OTHER PUBLICATIONS

Extended European Search Report Issued in Corresponding EP Patent Application No. 21891783.9, dated Jan. 2, 2025.

* cited by examiner

Fig.6

|  | With switching mechanism | Without switching mechanism |
|---|---|---|
| M1 Output [kW] | Same ||
| M2 Output [kW] | Small | Large |

POWER TRANSMISSION MECHANISM AND WORKING VEHICLE

CROSS REFERENCE TO RELATED APPLICATIONS

This application is a continuation application of International Application No. PCT/JP2021/040808, filed on Nov. 5, 2021, which claims the benefit of priority to Japanese Patent Application No. 2020-188105, filed on Nov. 11, 2020, to Japanese Patent Application No. 2020-188106, filed on Nov. 11, 2020, and to Japanese Patent Application No. 2020-188107, filed on Nov. 11, 2020. The entire contents of each of these applications are hereby incorporated herein by reference.

BACKGROUND OF THE INVENTION

1. Field of the Invention

The present invention relates to a power transmission mechanism to transmit power from a plurality of motors to load(s), and a working vehicle including the power transmission mechanism.

The present invention also relates to a power transmission mechanism for installation in a working vehicle including a traveling device and a working device, and a working vehicle including the power transmission mechanism.

The present invention also relates to a power transmission mechanism which uses a plurality of motors, and a working vehicle including the power transmission mechanism.

2. Description of the Related Art

A power transmission mechanism disclosed in Published Japanese Translation of PCT International Application No. 2020-500764 is known as a power transmission mechanism to transmit power from a plurality of motors to load(s). The power transmission mechanism disclosed in FIG. 8 of Published Japanese Translation of PCT International Application No. 2020-500764 includes first and second motors and a planetary gear mechanism including a ring gear, a planet carrier, and a sun gear. Power from the first and second motors is introduced into the planetary gear mechanism, and the planetary gear mechanism sends out power.

A power transmission mechanism disclosed in Japanese Unexamined Patent Application Publication No. 2003-136970 is known as a power transmission mechanism for installation in a working vehicle including a traveling device and a working device. The power transmission mechanism disclosed in FIG. 3 of Japanese Unexamined Patent Application Publication No. 2003-136970 includes a travel motor and a PTO motor, and is configured such that front and rear wheels and the PTO shaft are driven using these two motors.

The power transmission mechanism disclosed in Published Japanese Translation of PCT International Application No. 2020-500764 is known as a power transmission mechanism to use a plurality of motors. The power transmission mechanism disclosed in FIG. 8 of Published Japanese Translation of PCT International Application No. 2020-500764 includes first and second motors and a planetary gear mechanism including a ring gear, a planet carrier, and a sun gear. Power from the first and second motors is introduced into the planetary gear mechanism, and the planetary gear mechanism sends out power.

SUMMARY OF THE INVENTION

However, the power transmission mechanism disclosed in Published Japanese Translation of PCT International Application No. 2020-500764 is configured such that power introduced from the first and second motors into the planetary gear mechanism is taken out through a single output shaft, and the power introduced from the first and second motors into the planetary gear mechanism cannot be taken out through a plurality of output shafts. Therefore, the power transmission mechanism is not suitable as a mechanism to drive a plurality of loads (driven portions) efficiently.

In the case of the power transmission mechanism disclosed in Japanese Unexamined Patent Application Publication No. 2003-136970, under normal conditions, the PTO shaft is driven by rotational power from the PTO motor, and the rear wheels are driven to rotate by rotational power from the travel motor. In cases where the rotational load on the rear wheels increases and power from the PTO system is not fully used, a portion of the power from the PTO system is applied to the travel system by engaging clutch(es). However, the power transmission mechanism disclosed in Japanese Unexamined Patent Application Publication No. 2003-136970 is not configured such that the rotational power from the travel motor is sent to the PTO shaft. Therefore, it is not possible to drive the working device connected to the PTO shaft efficiently using a plurality of motors.

Furthermore, the power transmission mechanism disclosed in Published Japanese Translation of PCT International Application No. 2020-500764 is configured such that the power from the first and second motors is introduced into the planetary gear mechanism and the planetary gear mechanism sends power to the output shaft, and therefore, when the rotation of the output shaft is to be stopped, the rotation speed of the first motor and that of the second motor are adjusted such that the rotation speed of the output shaft is zero. However, there are cases in which, due to differences in rotation speed between the first and second motors, the rotation speed of the output shaft cannot be maintained at zero, making it difficult to reliably stop the rotation of the output shaft.

Preferred embodiments of the present invention provide power transmission mechanisms in each of which power introduced from a plurality of motors into a planetary gear mechanism can be taken out through a plurality of output shafts and which makes it possible to efficiently drive a plurality of loads (driven portions), and working vehicles each including such a power transmission mechanism.

Preferred embodiments of the present invention also provide power transmission mechanisms each of which is for installation in a working vehicle including a traveling device and a working device and which makes it possible to drive the working device efficiently using a plurality of motors, and working vehicles each including the power transmission mechanism.

Preferred embodiments of the present invention also provide power transmission mechanisms each of which is configured such that power from a plurality of motors is introduced into a planetary gear mechanism and power is sent from the planetary gear mechanism to output shaft(s) and in which the rotation of the output shaft(s) can be reliably stopped, and working vehicles each including the power transmission mechanism.

Preferred embodiments of the present invention may include the following features.

A power transmission mechanism according to an aspect of the present invention includes a first motor, a second motor, a first input shaft to which power is transmitted from the first motor, a second input shaft to which power is transmitted from the second motor, a first output shaft to transmit power to a first driven portion, a second output shaft to transmit power to a second driven portion, and a transmission mechanism which includes a planetary gear mechanism to receive power from the first input shaft and the second input shaft, and is operable to send power from the first input shaft and the second input shaft to the first output shaft and the second output shaft.

The power transmission mechanism may further include an interrupting mechanism operable to interrupt power transmission from the first output shaft to the first driven portion.

The power transmission mechanism may further include a switching mechanism operable to change a direction of rotation of the second output shaft.

The second motor may be operable to, when the direction of rotation of the second output shaft is to be changed from a forward direction to a reverse direction, introduce, into the planetary gear mechanism, rotational power to counter rotational power that is introduced into the planetary gear mechanism by driving the first motor to rotate the second output shaft in the forward direction.

The power transmission mechanism may be configured such that, when the direction of rotation of the second output shaft is to be changed from the forward direction to the reverse direction, the direction of rotation of the second output shaft is changed by the switching mechanism from the forward direction to the reverse direction to reduce the rotational power introduced to counter the rotational power from the first motor as compared to a case where the direction of rotation of the second output shaft is not changed by the switching mechanism.

The second motor may be a low-power, small motor as compared to the first motor.

The first motor may be operable to rotate at a constant rotation speed. The second motor may be operable to rotate at a rotation speed that varies depending on a required rotation speed of the second output shaft.

The first motor and the second motor may be operable to rotate at speeds that vary depending on a required rotation speed of the first output shaft and a required rotation speed of the second output shaft.

The planetary gear mechanism may include a sun gear to receive power from the first input shaft, a ring gear including internal teeth and external teeth and being operable to send power to the second output shaft from the external teeth, a planet gear to mesh with the internal teeth and the sun gear, and a planet carrier to support the planet gear and receive power from the second input shaft.

The planetary gear mechanism may include a ring gear including internal teeth and external teeth and being operable to receive power from the first input shaft at the external teeth and send power to the second output shaft from the external teeth, a sun gear to receive power from the second input shaft, a planet gear to mesh with the internal teeth and the sun gear, and a planet carrier to support the planet gear and send power to the first output shaft.

The planetary gear mechanism may include a ring gear including internal teeth and external teeth and being operable to receive power from the first input shaft at the external teeth and send power to the first output shaft from the external teeth, a sun gear to receive power from the second input shaft, a planet gear to mesh with the internal teeth and the sun gear, and a planet carrier to support the planet gear and send power to the second output shaft.

The transmission mechanism may include a first transmission portion to transmit power from the first input shaft to the first output shaft such that the power from the first input shaft does not pass through the planetary gear mechanism. The interrupting mechanism may be operable to interrupt power transmission from the first transmission portion via the first output shaft to the first driven portion.

The transmission mechanism may include a first transmission portion to transmit power from the planetary gear mechanism to the first output shaft. The interrupting mechanism may be operable to interrupt power transmission from the first transmission portion via the first output shaft to the first driven portion.

The transmission mechanism may include a second transmission portion to transmit power from the planetary gear mechanism to the second output shaft. The switching mechanism may be included in the second transmission portion.

The power transmission mechanism may be a power transmission mechanism for installation in a working vehicle. The first driven portion may be a working device attached to the working vehicle. The second driven portion may be a traveling device included in the working vehicle.

The first output shaft may be a PTO shaft to transmit power to the working device. The second output shaft may be an axle to which one or more wheels of the traveling device are connected.

A working vehicle according to an aspect of the present invention may include any of the above-described power transmission mechanisms.

A power transmission mechanism according to an aspect of the present invention is a power transmission mechanism for installation in a working vehicle including a traveling device and a working device, the power transmission mechanism including a first motor, a second motor, and a transmission mechanism which includes a planetary gear mechanism to receive power from the first motor and the second motor, and is operable to send power from the first motor and/or the second motor to the working device.

The planetary gear mechanism may be operable to send the received power to the traveling device.

The power transmission mechanism may further include a controller to control operation of the first motor and the second motor. The controller may be configured or programmed to change a difference between a rotation speed of the first motor and a rotation speed of the second motor to change output from the planetary gear mechanism.

The controller may be configured or programmed to keep the rotation speed of the first motor constant, and change the rotation speed of the second motor depending on output necessary for the traveling device.

The controller may be configured or programmed to change the rotation speed of the first motor and the rotation speed of the second motor depending on output necessary for the working device and output necessary for the traveling device.

The planetary gear mechanism may include a sun gear to receive power from the first motor, a ring gear including internal teeth and external teeth and being operable to send power to the traveling device from the external teeth, a planet gear to mesh with the internal teeth and the sun gear, and a planet carrier to support the planet gear and receive power from the second motor.

The planetary gear mechanism may include a ring gear including internal teeth and external teeth and being operable to receive power from the first motor at the external teeth and transmit power to the traveling device from the external teeth, a sun gear to receive power from the second motor, a planet gear to mesh with the internal teeth and the sun gear, and a planet carrier to support the planet gear and send power to the working device.

The planetary gear mechanism may include a ring gear including internal teeth and external teeth and being operable to receive power from the first motor at the external teeth and send power to the working device from the external teeth, a sun gear to receive power from the second motor, a planet gear to mesh with the internal teeth and the sun gear, and a planet carrier to support the planet gear and send power to the traveling device.

The power transmission mechanism may further include a first input shaft to transmit power from the first motor to the planetary gear mechanism, a second input shaft to transmit power from the second motor to the planetary gear mechanism, a first output shaft to send power transmitted from the transmission mechanism to the working device, and a second output shaft to send power transmitted from the transmission mechanism to the traveling device. The first output shaft may be a PTO shaft to transmit power to the working device. The second output shaft may be an axle to which one or more wheels of the traveling device are connected.

The power transmission mechanism may further include an interrupting mechanism operable to interrupt power transmission from the first output shaft to the working device.

The power transmission mechanism may further include a switching mechanism operable to change a direction of rotation of the second output shaft.

The second motor may be operable to, when the direction of rotation of the second output shaft is changed from a forward direction to a reverse direction, introduce, into the planetary gear mechanism, rotational power to counter rotational power that is introduced into the planetary gear mechanism by driving the first motor to rotate the second output shaft in the forward direction.

The power transmission mechanism may be configured such that, when the direction of rotation of the second output shaft is changed from the forward direction to the reverse direction, the direction of rotation of the second output shaft is changed by the switching mechanism from the forward direction to the reverse direction to reduce the rotational power introduced to counter the rotational power from the first motor as compared to a case where the direction of rotation of the second output shaft is not changed by the switching mechanism.

The second motor may be a low-power, small motor as compared to the first motor.

A working vehicle according to an aspect of the present invention may include any of the above-described power transmission mechanisms.

A power transmission mechanism according to an aspect of the present invention includes a first motor, a second motor, a planetary gear mechanism to receive power from the first motor and the second motor and send the received power to an output shaft, a controller to transmit, according to a required rotation speed of the output shaft, command signals to command the first motor and the second motor to be driven at rotation speeds necessary to cause the output shaft to rotate at the required rotation speed, a sensor to measure a rotation speed of the output shaft, and a brake to stop rotation of the output shaft, wherein the controller is configured or programmed to, when the rotation of the output shaft is to be stopped, transmit the command signals to control the required rotation speed to zero and then actuate the brake if the rotation speed measured by the sensor is not zero.

A working vehicle according to an aspect of the present invention includes a vehicle body, wheels to support the vehicle body such that the vehicle body is allowed to travel, a first motor, a second motor, a planetary gear mechanism to receive power from the first motor and the second motor and send the received power to an axle of the wheels, a controller to transmit, according to a required rotation speed of the wheels, command signals to command the first motor and the second motor to be driven at rotation speeds necessary to cause the wheels to rotate at the required rotation speed, a sensor to measure a rotation speed of the wheels, and a brake to stop rotation of the wheels, wherein the controller is configured or programmed to, when the rotation of the wheels is to be stopped, transmit the command signals to control the required rotation speed to zero and then actuate the brake if the rotation speed measured by the sensor is not zero.

The controller may be configured or programmed to, when the rotation of the wheels is to be stopped, transmit one of the command signals that is a command signal to command the first motor or the second motor to stop rotating.

The working vehicle may further include a switching mechanism operable to change a direction of rotation of the axle.

The working vehicle may further include a PTO shaft to drive a working device attached to the vehicle body, a first input shaft to which power is transmitted from the first motor, and a second input shaft to which power is transmitted from the second motor. The planetary gear mechanism may be operable to receive power from the first input shaft and the second input shaft, and send the received power to the axle and the PTO shaft.

The planetary gear mechanism may include a ring gear including internal teeth and external teeth and being operable to transmit power to the axle from the external teeth, a sun gear to receive power from the first input shaft, a planet gear to mesh with the internal teeth and the sun gear, and a planet carrier to support the planet gear and receive power from the second input shaft. Power from the first input shaft may be transmitted to the PTO shaft without passing through the planetary gear mechanism.

The planetary gear mechanism may include a ring gear including internal teeth and external teeth and being operable to receive power from the first input shaft at the external teeth and transmit power to the axle from the external teeth, a sun gear to receive power from the second input shaft, a planet gear to mesh with the internal teeth and the sun gear, and a planet carrier to support the planet gear and send power to the PTO shaft.

The planetary gear mechanism may include a ring gear including internal teeth and external teeth and being operable to receive power from the first input shaft at the external teeth and transmit power to the PTO shaft from the external teeth, a sun gear to receive power from the second input shaft, a planet gear to mesh with the internal teeth and the sun gear, and a planet carrier to support the planet gear and send power to the axle.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 6 shows the output of the first motor and the output of the second motor produced when there is the switching mechanism, and shows the output of the first motor and the output of the second motor produced when there is no switching mechanism.

DETAILED DESCRIPTION OF THE PREFERRED EMBODIMENTS

Figure 1:
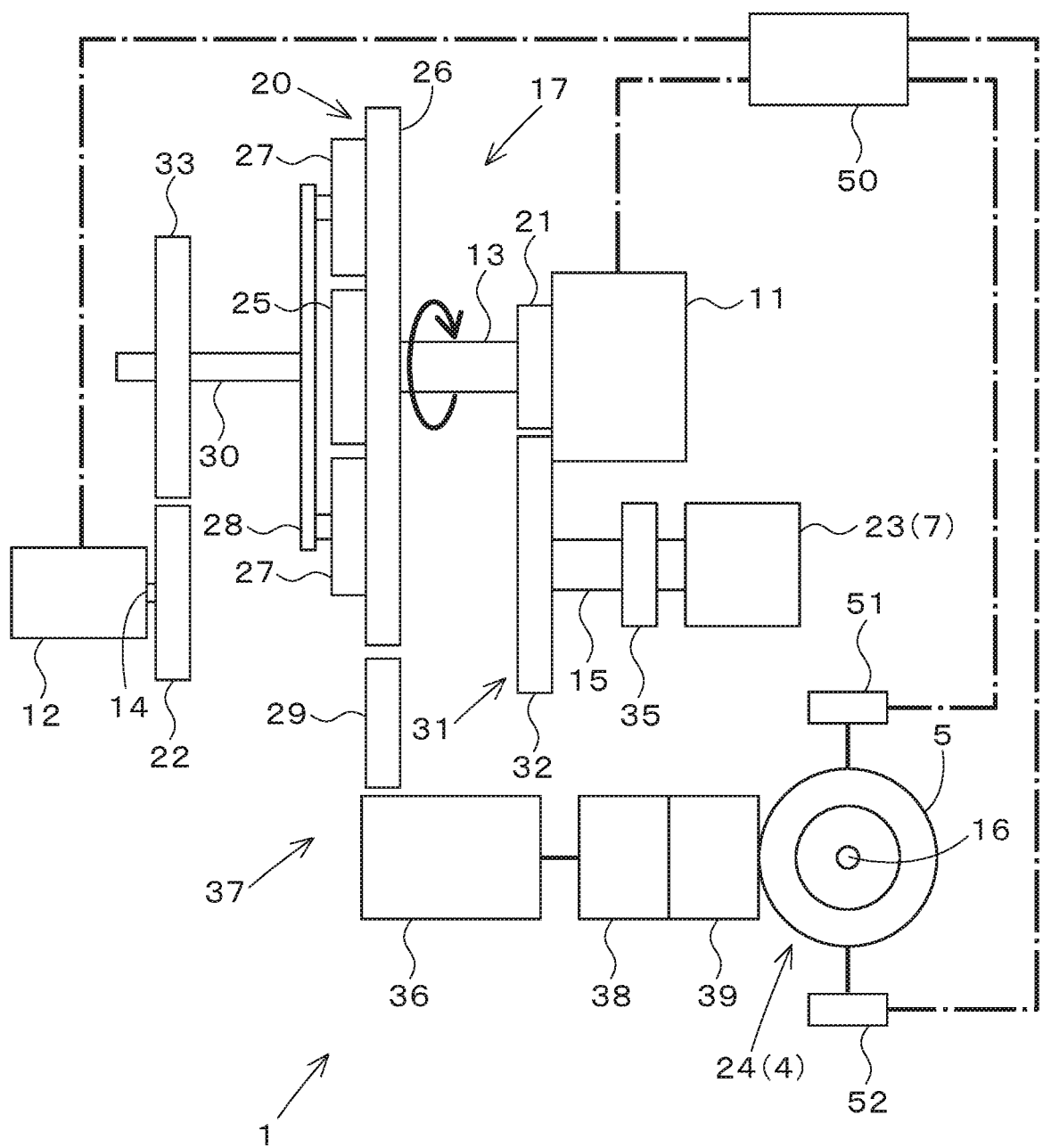
FIG. 1 illustrates a first embodiment of a power transmission mechanism according to the present invention.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses preferred embodiments of the present invention with reference to the drawings.

FIG. 1 illustrates a power transmission mechanism 1 according to an embodiment (first embodiment) of the present invention.

The power transmission mechanism 1 according to a preferred embodiment of the present invention can be used widely as a power transmission mechanism for industrial machines (such as agricultural machines, construction machines, utility vehicles, mowers, engine generators) and various types of machines. For example, the power transmission mechanism 1 can be installed and used in a working vehicle 2 such as a tractor. The following description discusses an example case in which the power transmission mechanism 1 is included in the working vehicle 2.

Figure 9:
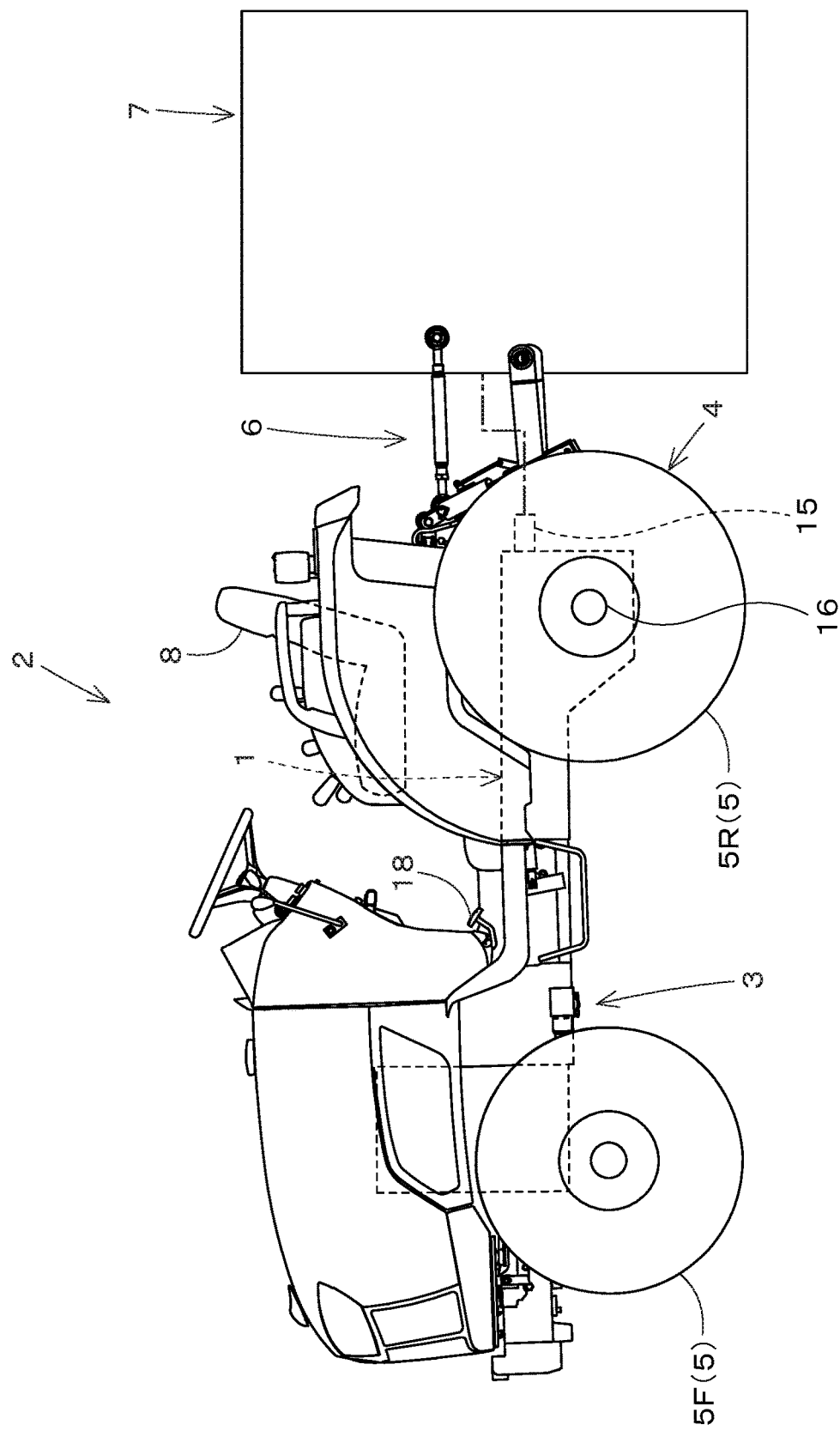
FIG. 9 illustrates an embodiment of a working vehicle according to a preferred embodiment of the present invention.

FIG. 9 illustrates a tractor, which is an example of the working vehicle 2 according to a preferred embodiment of the present invention. The working vehicle 2 includes a vehicle body 3, a traveling device 4 to support the vehicle body 3 such that the vehicle body 3 is allowed to travel, an operator's seat 8 on the vehicle body 3, and the power transmission mechanism 1. The traveling device 4 includes wheels 5. The wheels 5 include front wheels 5F and rear wheels 5R. The vehicle body 3 is provided, at a rear portion thereof, with a linkage 6 such as a three-point linkage. A working device 7 is detachably attached to the linkage 6. The working device 7 is, for example, but is not limited to, a ground implement such as a spreader to spread agricultural chemicals, fertilizer, and/or the like, a seeder for seeding, a cultivator for cultivation, or a transplanter to plant seedlings.

The following discusses a configuration of the power transmission mechanism 1 of the first embodiment.

As illustrated in FIG. 1, the power transmission mechanism 1 includes a first motor 11, a second motor 12, a first input shaft 13, a second input shaft 14, a first output shaft 15, a second output shaft 16, and a transmission mechanism 17.

The first motor 11 and the second motor 12 are preferably electric motors. The driving of the first motor 11 and the second motor 12 is controlled by a controller 50 (described later). The controller 50, for example, when the power transmission mechanism 1 is actuated, causes the first motor 11 to rotate at a constant rotation speed and changes the rotation speed of the second motor 12 as necessary. In such a case, the rotation speed of the second motor 12 changes depending on the required rotation speed of the second output shaft 16. The output (horsepower) of the first motor 11 and that of the second motor 12 may be the same and one of the two may be greater than the other. It is preferable that the second motor 12 be a low-power, small motor as compared to the first motor 11. The first motor 11 and the second motor 12 may each be a motor that is rotatable only in a single direction (forward direction) or a motor that is rotatable in opposite directions (forward and reverse directions).

The power transmission mechanism 1 may further include another motor(s) in addition to the first motor 11 and the second motor 12. That is, the power transmission mechanism 1 need only include at least two motors, and may include three or more motors.

The first input shaft 13 is a shaft to receive power from the first motor 11 (a shaft to which power from the first motor 11 is transmitted (introduced)). The first input shaft 13 projects from the first motor 11 and is driven by the first motor 11 to rotate. The first input shaft 13 has a first input gear 21 attached thereto. The first input shaft 13 transmits power from the first motor 11 to a planetary gear mechanism 20.

The second input shaft 14 is a shaft to receive power from the second motor 12 (a shaft to which power from the second motor 12 is transmitted (introduced)). The second input shaft 14 projects from the second motor 12 and is driven by the second motor 12 to rotate. The second input shaft 14 has a second input gear 22 attached thereto. The second input shaft 14 transmits power from the second motor 12 to the planetary gear mechanism 20.

The first output shaft 15 is a shaft to transmit (send) power to a first driven portion 23. In the present embodiment, the first driven portion 23 is the working device 7 attached to the working vehicle 2, and the first output shaft 15 is a PTO shaft 15 to transmit power to the working device 7. The PTO shaft 15 drives the working device 7 attached to the vehicle body 3. The first output shaft (PTO shaft) 15 sends power transmitted from a transmission mechanism 17 (described later) to the working device 7. The working device 7 is, for example, a device driven by hydraulic actuator(s) such as hydraulic pump(s). In such a case, the hydraulic actuator(s) is/are driven by power sent from the PTO shaft 15, and the working device 7 is driven by the hydraulic actuator(s) being driven.

The second output shaft 16 is a shaft to transmit (send) power to a second driven portion 24. In the present embodiment, the second driven portion 24 is the traveling device 4 of the working vehicle 2. The second output shaft 16 sends power transmitted from the transmission mechanism 17 to the traveling device 4. In the present embodiment, the second output shaft 16 is an axle 16 to which wheels 5 of the traveling device 4 are connected. The axle 16 includes a left axle portion to which a left wheel of the working vehicle 2 is connected, and a right axle portion to which a right wheel of the working vehicle 2 is connected. In the present embodiment, the axle 16 is an axle for the rear wheels 5R, but may be an axle for the front wheels 5F.

The transmission mechanism 17 sends, to the working device 7, power from at least one of the first and second motors 11 and 12 (i.e., the first motor 11 and/or the second motor 12, or one of or both of the first and second motors 11 and 12). The transmission mechanism 17 includes a planetary gear mechanism 20 to receive power from the first input shaft 13 and from the second input shaft 14. Specifically, the transmission mechanism 17 includes "the planetary gear mechanism 20, the first input gear 21, the second input gear 22, a first gear 29, a first shaft 30, a second gear 32, a third gear 33, a switching mechanism 36, a speed change mechanism 38, and a differential (differential gear mechanism) 39" of the elements illustrated in FIG. 1. The transmission mechanism 17 sends power from the first input shaft 13 and the second input shaft 14 to the first output shaft 15 and the second output shaft 16.

The planetary gear mechanism 20 receives power from the first motor 11 and the second motor 12, and sends the received power to the first output shaft (PTO shaft) 15 and the second output shaft (axle) 16. The planetary gear mechanism 20 also sends the power received from the first motor 11 and the second motor 12 to the working device 7 via the PTO shaft 15 and to the traveling device 4 via the axle 16.

The planetary gear mechanism 20 includes a sun gear 25, a ring gear 26, planet gear(s) 27, and a planet carrier 28. The sun gear 25 is connected to the first input shaft 13 and receives power from the first input shaft 13. The ring gear 26 includes internal teeth and external teeth. The internal teeth mesh with the planet gear(s) 27. The external teeth mesh with the first gear 29. The ring gear 26 sends power to the second output shaft 16 from the external teeth via the first gear 29 and/or the like. With this, the ring gear 26 is capable of sending power to the axle (second output shaft) 16 and the traveling device 4 from the external teeth via the first gear 29 and/or the like.

The planet gear(s) 27 mesh(es) with the internal teeth of the ring gear 26 and the sun gear 25. The planet carrier 28 supports the planet gear(s) 27 such that the planet gear(s) 27 is/are rotatable (such that the planet gear(s) 27 can rotate on its axis and revolve around an external axis). The planet carrier 28 receives power from the second input shaft 14. The planet carrier 28 has connected thereto an end of the first shaft 30. The opposite end of the first shaft 30 is connected to the third gear 33. The third gear 33 meshes with the second input gear 22.

The transmission mechanism 17 includes a first transmission portion 31 to transmit power from the first input shaft 13 to the first output shaft 15 such that the power from the first input shaft 13 does not pass through the planetary gear mechanism 20. The first transmission portion 31 includes the second gear 32 to mesh with the first input gear 21. The second gear 32 is connected to the first output shaft 15. Power from the first input shaft 13 is transmitted from the first input gear 21 via the second gear 32 to the first output shaft 15.

The power transmission mechanism 1 includes an interrupting mechanism 35 to interrupt power transmission from the first output shaft 15 to the first driven portion 23. Specifically, the interrupting mechanism 35 to interrupt power transmission from the first output shaft 15 to the first driven portion 23 is provided between the first output shaft 15 which is a shaft to send out power from the planetary gear mechanism 20 and the first driven portion 23 which receives power from the first output shaft 15.

The interrupting mechanism 35 is capable of interrupting power transmission from the first transmission portion 31 via the first output shaft 15 to the first driven portion 23. In the present embodiment, since the first driven portion 23 is the working device 7, the interrupting mechanism 35 is capable of interrupting power transmission from the first output shaft 15 to the working device 7.

The interrupting mechanism 35 is not particularly limited as to its specific mechanism, provided that the interrupting mechanism 35 is capable of switching between a state in which power transmission from the first transmission portion 31 via the first output shaft 15 to the first driven portion 23 is allowed and a state in which such power transmission is interrupted. The interrupting mechanism 35 is, for example, clutch(es) and/or the like. In the case where the interrupting mechanism 35 is a clutch, the engagement of the clutch allows power transmission from the first transmission portion 31 via the first output shaft 15 to the first driven portion 23, whereas the disengagement of the clutch interrupts the power transmission from the first transmission portion 31 via the first output shaft 15 to the first driven portion 23. Thus, the presence of the interrupting mechanism 35 makes it possible to prevent power sent from the planetary gear mechanism 20 from being transmitted to the first driven portion 23 via the first output shaft 15.

The power transmission mechanism 1 includes the switching mechanism 36 operable to change the direction of rotation of the second output shaft 16. The switching mechanism 36 is capable of switching the direction of rotation of the second output shaft 16 between a forward direction (clockwise direction) and a reverse direction (counterclockwise direction). In the case where the second output shaft 16 is the axle 16, when the direction of rotation of the second output shaft 16 is the forward direction, the wheels 5 of the traveling device 4 rotate in the forward direction to cause the working vehicle 2 to travel forward. When the direction of rotation of the second output shaft 16 is the reverse direction, the wheels 5 of the traveling device 4 rotate in the reverse direction to cause the working vehicle 2 to travel rearward. The switching mechanism 36 is not particularly limited, provided that the switching mechanism 36 is capable of changing the direction of rotation of the second output shaft 16. For example, the switching mechanism 36 is a mechanism in which the direction of rotation of the second output shaft 16 is changed by changing the connection of gears by operating a lever and/or the like, and/or the like.

The transmission mechanism 17 includes a second transmission portion 37 to transmit power from the planetary gear mechanism 20 to the second output shaft 16. The second transmission portion 37 includes the switching mechanism 36. The second transmission portion 37 includes the first gear 29, the switching mechanism 36, the speed change mechanism 38, and the differential 39. The first gear 29 receives rotational power sent from the external teeth of the ring gear 26 of the planetary gear mechanism 20. The speed change mechanism 38 is an auxiliary speed change mechanism (a speed change mechanism provided in addition to a main speed change mechanism) of the working vehicle 2, is actuated by operation of a lever and/or the like, and changes the rotation speed of the rotational power transmitted by rotation of the first gear 29 to the second transmission portion 37. The differential 39 appropriately distributes the rotational power changed by the speed change mechanism 38 onto the left axle portion and the right axle portion of the second output shaft 16.

With the foregoing power transmission mechanism 1 of the first embodiment, when the first motor 11 rotates at a constant rotation speed, it is possible to drive the first output shaft (PTO shaft) 15 at a constant rotation speed. Furthermore, by changing the rotation speed of the second motor 12, it is possible to change the rotation speed of the second output shaft (axle) 16 to control the travel speed of the working vehicle 2. It is also possible, by combining power from the first motor 11 and power from the second motor 12, to control the torque for travel necessary for the working vehicle 2 and the travel speed of the working vehicle 2. It is also possible, by designing the first motor 11 according to the torque and/or rotation speed necessary for the PTO shaft 15, to easily control the driving of the PTO shaft 15 and the like.

Figure 2:
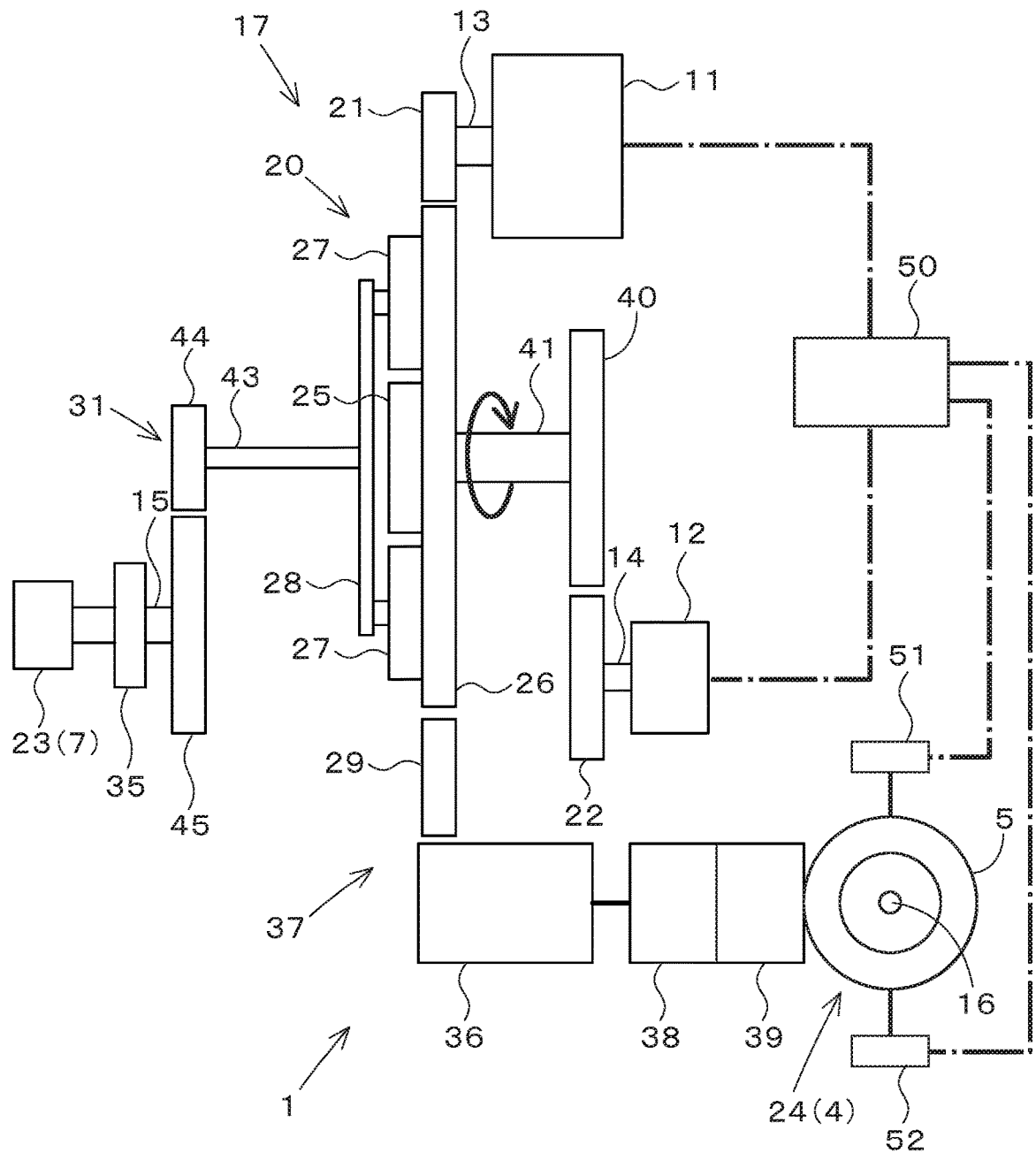
FIG. 2 illustrates a second embodiment of a power transmission mechanism according to the present invention.

FIG. 2 illustrates a power transmission mechanism 1 according to another embodiment (second embodiment) of the present invention.

As illustrated in FIG. 2, the power transmission mechanism 1 of the second embodiment includes a first motor 11, a second motor 12, a first input shaft 13, a second input shaft 14, a first output shaft 15, a second output shaft 16, and a transmission mechanism 17, similarly to the first embodiment. The elements that are the same between the first embodiment and the second embodiment are assigned identical reference numerals.

The first motor 11 and the second motor 12 are the same in configuration as those of the first embodiment.

The first input shaft 13 is a shaft to receive power from the first motor 11 (a shaft to which power from the first motor 11 is transmitted (introduced)). The first input shaft 13 projects from the first motor 11 and is driven by the first motor 11 to rotate. The first input shaft 13 has a first input gear 21 attached thereto. The first input shaft 13 transmits power from the first motor 11 to a planetary gear mechanism 20 via the first input gear 21.

The second input shaft 14 is a shaft to receive power from the second motor 12 (a shaft to which power from the second motor 12 is transmitted (introduced)). The second input shaft 14 projects from the second motor 12 and is driven by the second motor 12 to rotate. The second input shaft 14 has a second input gear 22 attached thereto. The second input gear 22 meshes with a first transmission gear 40. The first transmission gear 40 is connected to a first transmission shaft 41. The second input shaft 14 transmits power from the second motor 12 to the planetary gear mechanism 20 via the second input gear 22, the first transmission gear 40, and the first transmission shaft 41.

The first output shaft 15 is a shaft to transmit (send) power to a first driven portion 23. Also in the present embodiment, the first driven portion 23 is the working device 7 attached to the working vehicle 2. The first output shaft 15 is a PTO shaft 15 to transmit power to the working device 7. The first output shaft (PTO shaft) 15 sends power transmitted from a transmission mechanism 17 to the working device 7. The working device 7 is, for example, a device driven by hydraulic actuator(s) such as hydraulic pump(s). In such a case, the hydraulic actuator(s) is/are driven by power sent from the PTO shaft 15, and the working device 7 is driven by the hydraulic actuator(s) being driven.

The second output shaft 16 is a shaft to transmit (send) power to a second driven portion 24. Also in the present embodiment, the second driven portion 24 is the traveling device 4 of the working vehicle 2, similarly to the first embodiment. The second output shaft 16 sends power transmitted from the transmission mechanism 17 to the traveling device 4. The second output shaft 16 is the axle 16 to which the wheels 5 of the traveling device 4 are connected.

The transmission mechanism 17 sends, to the working device 7, power from at least one of the first and second motors 11 and 12 (i.e., the first motor 11 and/or the second motor 12, or one of or both of the first and second motors 11 and 12). The transmission mechanism 17 includes a planetary gear mechanism 20 to receive power from the first input shaft 13 and from the second input shaft 14. Specifically, the transmission mechanism 17 includes "the planetary gear mechanism 20, the first input gear 21, the second input gear 22, a first gear 29, the first transmission gear 40, the first transmission shaft 41, a second transmission shaft 43, a second transmission gear 44, a third transmission gear 45, a switching mechanism 36, a speed change mechanism 38, and a differential (differential gear mechanism) 39" of the elements illustrated in FIG. 2. The transmission mechanism 17 sends power from the first input shaft 13 and the second input shaft 14 to the first output shaft 15 and the second output shaft 16.

The planetary gear mechanism 20 sends power received from the first motor 11 and from the second motor 12 to the traveling device 4. The planetary gear mechanism 20 also sends power received from the first motor 11 and from the second motor 12 to the working device 7.

The planetary gear mechanism 20 includes a sun gear 25, a ring gear 26, planet gear(s) 27, and a planet carrier 28. The sun gear 25 is connected to the first transmission shaft 41 and receives power from the second input shaft 14 via the second input gear 22, the first transmission gear 40, and the first transmission shaft 41. The ring gear 26 includes internal teeth and external teeth. The internal teeth mesh with the planet gear(s) 27. The external teeth mesh with the first input gear 21 and the first gear 29. With this, power from the first input shaft 13 is transmitted to the external teeth. The ring gear 26 sends power to the second output shaft 16 from the external teeth via the first gear 29 and/or the like. With this, the ring gear 26 is capable of sending power to the axle (second output shaft) 16 and the traveling device 4 from the external teeth via the first gear 29 and/or the like.

The planet gear(s) 27 mesh(es) with the internal teeth of the ring gear 26 and the sun gear 25. The planet carrier 28 supports the planet gear(s) 27 such that the planet gear(s) 27 is/are rotatable (such that the planet gear(s) 27 can rotate on its axis and revolve around an external axis). The planet carrier 28 has connected thereto an end of the second transmission shaft 43. The opposite end of the second transmission shaft 43 is connected to the second transmission gear 44. The second transmission gear 44 meshes with the third transmission gear 45.

The transmission mechanism 17 includes a first transmission portion 31 to transmit power from the planetary gear mechanism 20 to the first output shaft 15. The first transmission portion 31 includes the second transmission gear 44 and the third transmission gear 45. The third transmission gear 45 is connected to the first output shaft 15. The planet carrier 28 sends power to the first output shaft 15 via the second transmission shaft 43 and the first transmission portion (second transmission gear 44, third transmission gear 45). In the present embodiment, the planet carrier 28 sends power to the PTO shaft 15 and the working device 7 via the second transmission shaft 43 and the first transmission portion (second transmission gear 44, third transmission gear 45).

The power transmission mechanism 1 includes an interrupting mechanism 35 to interrupt power transmission from the first output shaft 15 to the first driven portion 23. The configuration and functions (actions) of the interrupting mechanism 35 are the same as that of the first embodiment, and thus have already been described earlier.

The transmission mechanism 17 includes a second transmission portion 37 to transmit power from the planetary gear mechanism 20 to the second output shaft 16. The second transmission portion 37 includes a switching mechanism 36. The configurations and functions (actions) of the second transmission portion 37 and the switching mechanism 36 are the same as those of the first embodiment, and thus have already been described earlier.

In the case of the power transmission mechanism 1 of the second embodiment, the controller 50 changes the rotation speed of the first motor 11 and the rotation speed of the second motor 12 depending on output necessary for the working device 7 and output necessary for the traveling device 4. Since the rotation speed of the first motor 11 and the rotation speed of the second motor 12 are changed, the axle 16 (traveling device 4) and the PTO shaft 15 (working device 7) can be controlled in a fine-tuned manner. Specifically, the rotational power from the first motor 11 is sent as-is to the axle 16 via the ring gear 26 and the like, making it possible to control the driving of the traveling device 4 by adjusting the rotation speed and torque of the first motor 11. Furthermore, by combining the power from the first motor 11 and the power from the second motor 12 controlled by the controller 50, it is possible to send out the torque and rotation speed necessary for the PTO shaft 15 and control the driving of the working device 7.

Figure 3:
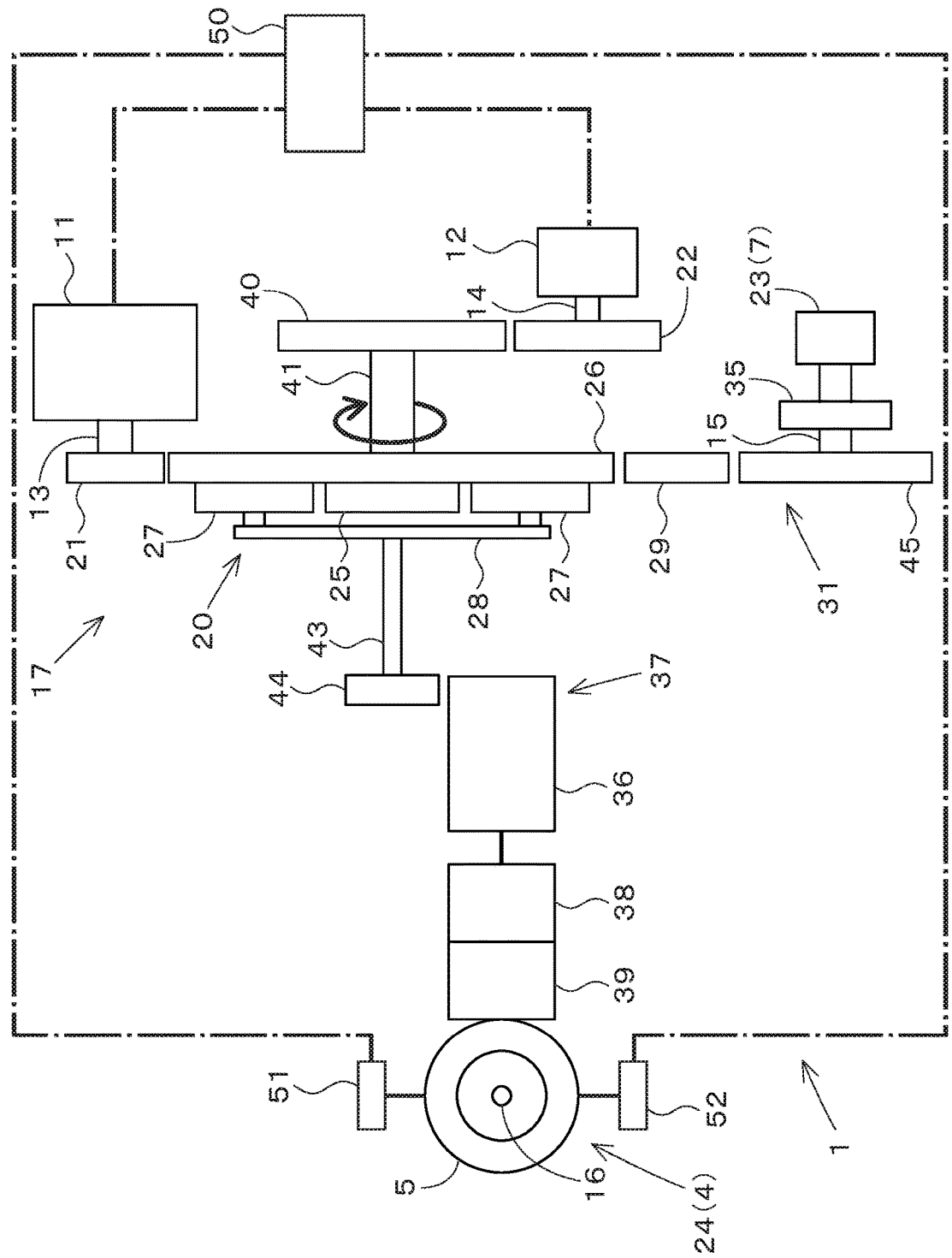
FIG. 3 illustrates a third embodiment of a power transmission mechanism according to the present invention.

FIG. 3 illustrates a power transmission mechanism 1 according to a further embodiment (third embodiment) of the present invention.

As illustrated in FIG. 3, the power transmission mechanism 1 of the third embodiment includes a first motor 11, a second motor 12, a first input shaft 13, a second input shaft 14, a first output shaft 15, a second output shaft 16, and a transmission mechanism 17, similarly to the first and second embodiments. Of the elements illustrated in FIG. 3, the elements that are the same as those of the first or second embodiment are assigned the same reference numerals as those of the first or second embodiment.

The first motor 11 and the second motor 12 are the same in configuration as those of the first and second embodiments.

The first input shaft 13 is a shaft to receive power from the first motor 11 (a shaft to which power from the first motor 11 is transmitted (introduced)). The first input shaft 13 projects from the first motor 11 and is driven by the first motor 11 to rotate. The first input shaft 13 has a first input gear 21 attached thereto. The first input shaft 13 transmits power from the first motor 11 to a planetary gear mechanism 20 via the first input gear 21.

The second input shaft 14 is a shaft to receive power from the second motor 12 (a shaft to which power from the second motor 12 is transmitted (introduced)). The second input shaft 14 projects from the second motor 12 and is driven by the second motor 12 to rotate. The second input shaft 14 has a second input gear 22 attached thereto. The second input gear 22 meshes with a first transmission gear 40. The first transmission gear 40 is connected to a first transmission shaft 41. The second input shaft 14 transmits power from the second motor 12 to the planetary gear mechanism 20 via the second input gear 22, the first transmission gear 40, and the first transmission shaft 41.

The first output shaft 15 is a shaft to transmit (send) power to a first driven portion 23. Also in the present embodiment, the first driven portion 23 is the working device 7 attached to the working vehicle 2. The first output shaft 15 is a PTO shaft 15 to transmit power to the working device 7. The first output shaft (PTO shaft) 15 sends power transmitted from the transmission mechanism 17 to the working device 7. The working device 7 is, for example, a device driven by hydraulic actuator(s) such as hydraulic pump(s). In such a case, the hydraulic actuator(s) is/are driven by power sent from the PTO shaft 15, and the working device 7 is driven by the hydraulic actuator(s) being driven.

The second output shaft 16 is a shaft to transmit (send) power to a second driven portion 24. Also in the present embodiment, the second driven portion 24 is the traveling device 4 of the working vehicle 2, similarly to the first and second embodiments. The second output shaft 16 sends power transmitted from the transmission mechanism 17 to the traveling device 4. The second output shaft 16 is the axle 16 to which the wheels 5 of the traveling device 4 are connected.

The transmission mechanism 17 sends, to the working device 7, power from at least one of the first and second motors 11 and 12 (i.e., the first motor 11 and/or the second motor 12, or one of or both of the first and second motors 11 and 12). The transmission mechanism 17 includes the planetary gear mechanism 20 to receive power from the first input shaft 13 and from the second input shaft 14. Specifically, the transmission mechanism 17 includes "the planetary gear mechanism 20, the first input gear 21, the second input gear 22, a first gear 29, the first transmission gear 40, the first transmission shaft 41, a second transmission shaft 43, a second transmission gear 44, a third transmission gear 45, a switching mechanism 36, a speed change mechanism 38, and a differential (differential gear mechanism) 39" of the elements illustrated in FIG. 3. The transmission mechanism 17 sends power from the first input shaft 13 and the second input shaft 14 to the first output shaft 15 and the second output shaft 16.

The transmission mechanism 17 includes a first transmission portion 31 to transmit power from the planetary gear mechanism 20 to the first output shaft 15. The first transmission portion 31 includes the first gear 29 and the third transmission gear 45. The third transmission gear 45 is connected to the first output shaft 15.

The transmission mechanism 17 includes a second transmission portion 37 to transmit power from the planetary gear mechanism 20 to the second output shaft 16. The second transmission portion 37 includes the second transmission gear 44, the switching mechanism 36, the speed change mechanism 38, and the differential 39. The configurations and functions (actions) of the switching mechanism 36 and the speed change mechanism 38 are the same as those of the first embodiment, and therefore have already been described earlier.

The planetary gear mechanism 20 sends power received from the first motor 11 and from the second motor 12 to the traveling device 4. The planetary gear mechanism 20 also sends power received from the first motor 11 and from the second motor 12 to the working device 7.

The planetary gear mechanism 20 includes a sun gear 25, a ring gear 26, planet gear(s) 27, and a planet carrier 28. The sun gear 25 is connected to the first transmission shaft 41 and receives power from the second input shaft 14 via the second input gear 22, the first transmission gear 40, and the first transmission shaft 41. The ring gear 26 includes internal teeth and external teeth. The internal teeth mesh with the planet gear(s) 27. The external teeth mesh with the first input gear 21 and the first gear 29. With this, power from the first input shaft 13 is transmitted to the external teeth. The ring gear 26 sends power to the first output shaft 15 from the external teeth via the first gear 29 and/or the like. With this, the ring gear 26 is capable of sending power to the PTO shaft (first output shaft) 15 and the working device 7 from the external teeth via the first gear 29 and/or the like.

The planet gear(s) 27 mesh(es) with the internal teeth of the ring gear 26 and the sun gear 25. The planet carrier 28 supports the planet gear(s) 27 such that the planet gear(s) 27 is/are rotatable (such that the planet gear(s) 27 can rotate on its axis and revolve around an external axis). The planet carrier 28 has connected thereto an end of the second transmission shaft 43. The opposite end of the second transmission shaft 43 is connected to the second transmission gear 44. The second transmission gear 44 transmits rotational power to the switching mechanism 36.

The planet carrier 28 sends power to the second output shaft 16 via the second transmission shaft 43 and the second transmission portion 37 including the second transmission gear 44 and the like. In the present embodiment, the planet carrier 28 sends power to the axle (second output shaft) 16 and the traveling device 4 via the second transmission shaft 43 and the second transmission portion 37.

The power transmission mechanism 1 includes an interrupting mechanism 35 to interrupt power transmission from the first output shaft 15 to the first driven portion 23. The configuration and functions (actions) of the interrupting mechanism 35 are the same as those of the first embodiment, and therefore have already been described earlier.

In the third embodiment, while the power transmission mechanism 1 is in operation, the controller 50 causes the first motor 11 to rotate at a constant rotation speed, and changes the rotation speed of the second motor 12 as necessary, similarly to the first embodiment. This makes it possible to drive the first output shaft (PTO shaft) 15 at a constant rotation speed. It is also possible, by changing the rotation speed of the second motor 12, to change the rotation speed of the second output shaft (axle) 16 to control the travel speed of the working vehicle 2. Furthermore, by combining power from the first motor 11 and power from the second motor 12, it is possible to control the toque for travel and travel speed necessary for the working vehicle 2. It is also possible, by designing the first motor 11 according to the torque and/or rotation speed necessary for the PTO shaft 15, to easily control the driving of the PTO shaft 15 and the like.

As illustrated in FIGS. 1, 2, and 3, the power transmission mechanism 1 of each of the first, second, and third embodiments includes the controller 50 to control operation of the first motor 11 and the second motor 12. The controller 50 is a computer including a processor such as a CPU and one or more memories such as RAM and/or ROM, and controls the operation of the first motor 11 and the second motor 12 in accordance with control program(s) stored in the one or more memories.

The controller 50 transmits, according to a required rotation speed of the second output shaft 16, command signals to command the first motor 11 and the second motor 12 to be driven at respective rotation speeds necessary to cause the second output shaft 16 to rotate at the required rotation speed. In the case where the second output shaft 16 is the axle 16, the controller 50 transmits, according to a required rotation speed of the wheels 5, command signals to command the first motor 11 and the second motor 12 to be driven at respective rotation speeds necessary to cause the wheels 5 to rotate at the required rotation speed.

For example, the controller 50 keeps the rotation speed of the first motor 11 constant, and changes the rotation speed of the second motor 12 depending on the output necessary for (torque or rotation speed necessary for) the second driven portion 24 (traveling device 4). Alternatively, the controller 50 changes the rotation speed of the first motor 11 and the rotation speed of the second motor 12 depending on the output necessary for (torque and/or rotation speed necessary for) the working device 7 and the traveling device 4. The controller 50 changes the difference between the rotation speed of the first motor 11 and the rotation speed of the second motor 12 to change the output of the planetary gear mechanism 20. This makes it possible to change the rotation speed and torque of the second output shaft 16 depending on the output necessary for the second driven portion 24 (traveling device 4).

The controller 50 is capable of actuating the switching mechanism 36 when changing the direction of rotation of the second output shaft 16 from the forward direction to the reverse direction.

The power transmission mechanism 1 is such that, when the direction of rotation of the second output shaft 16 is changed from the forward direction to the reverse direction, the second motor 12 introduces, into the planetary gear mechanism 20, rotational power to counter the rotational power introduced into the planetary gear mechanism 20 by driving the first motor 11 to rotate the second output shaft 16 in the forward direction.

It is noted here that, in the case where the switching mechanism 36 is not actuated, in order to counter the rotational power introduced into the planetary gear mechanism 20 by driving the first motor 11 to rotate the second output shaft 16 in the forward direction, it is necessary to introduce large rotational power to counter the rotational power from the second motor 12 into the planetary gear mechanism 20.

On the contrary, in the case where the switching mechanism 36 is actuated, by causing the switching mechanism 36 to switch the direction of rotation of the second output shaft 16 from the forward direction to the reverse direction when changing the direction of rotation of the second output shaft 16 from the forward direction to the reverse direction, it is possible to reduce the rotational power introduced to counter the rotational power from the first motor 11, as compared to the case where the direction of rotation of the second output shaft 16 is not changed by the switching mechanism 36. This makes it possible, in the case where the direction of rotation of the second output shaft 16 is changed from the forward direction to the reverse direction, to reduce the rotational power to counter the rotational power introduced from the second motor 12 into the planetary gear mechanism 20 or reduce the rotational power to zero.

The following description discusses advantages of the presence of the switching mechanism 36 based on specific examples (see FIGS. 4 to 7). In FIGS. 4 to 7, M1 represents the first motor 11, and M2 represents the second motor 12. The horizontal axis represents the rotation speed (rpm) of the first motor 11 and the second motor. The right portion (+) of the horizontal axis indicates rotation speed in the forward direction, whereas the left portion (−) of the horizontal axis indicates the rotation speed in the reverse direction. The vertical axis represents the torque (N/m) of the first motor 11 and the second motor. The upper portion (+) of the vertical axis indicates the torque in the forward direction (positive torque), whereas the lower portion (−) of the vertical axis indicates the torque in the reverse direction (negative torque).

Figure 4:
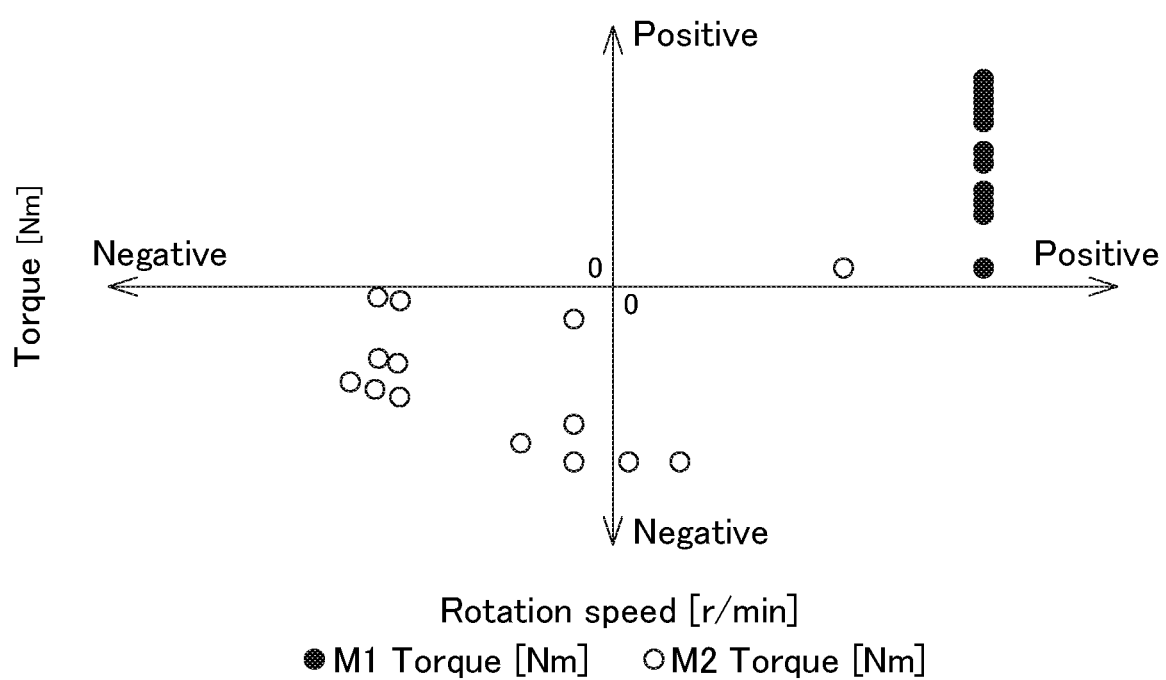
FIG. 4 shows an example of a motor NT curve showing the relationship between the torque and rotation speed of a first motor and a second motor in the case where the power transmission mechanism of the first embodiment is driven, in which there is a switching mechanism.
Figure 5:
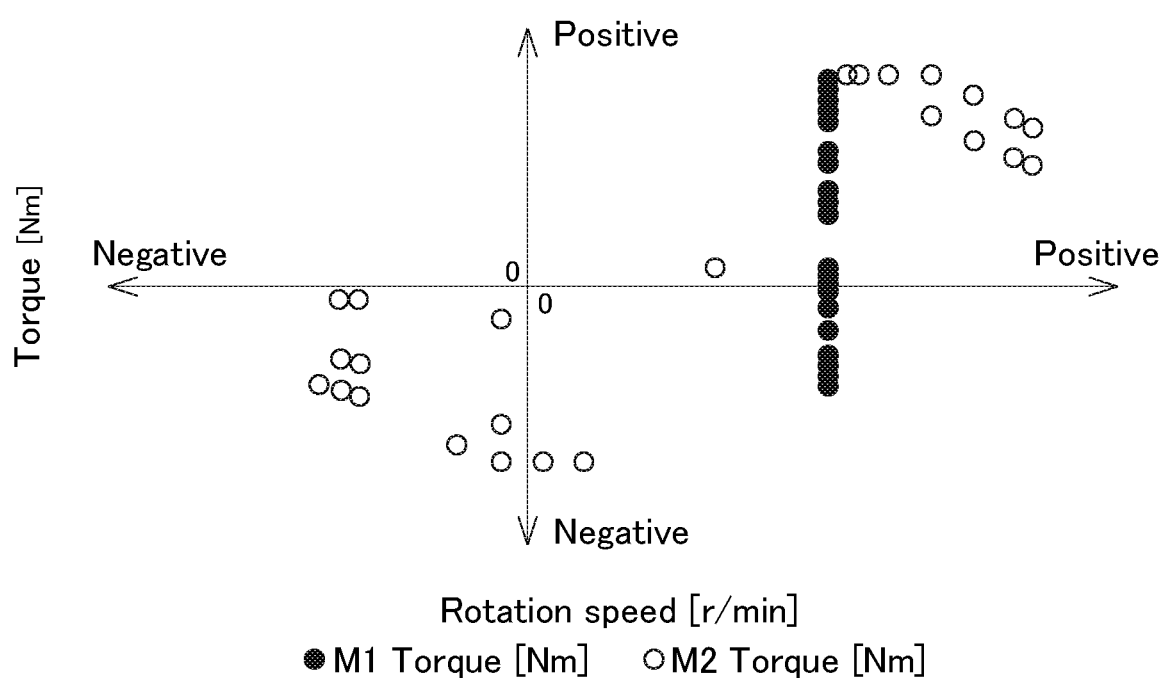
FIG. 5 shows an example of a motor NT curve showing the relationship between the torque and rotation speed of the first motor and the second motor in the case where the power transmission mechanism of the second embodiment is driven, in which there is no switching mechanism.

FIGS. 4 and 5 each show an example of a motor NT curve showing the relationship between the torque and rotation speed of the first motor 11 and the second motor 12 when the power transmission mechanism 1 of the first embodiment is driven. FIG. 4 shows a case in which there is the switching mechanism 36 (or the switching mechanism 36 is actuated), and FIG. 5 shows a case in which there is no switching mechanism 36 (or the switching mechanism 36 is not actuated).

The motor NT curves in FIGS. 4 and 5 are those obtained when the number of teeth of the first gear 29 is 77, the number of teeth of the second gear 32 is 44, the number of teeth of the third gear 33 is 154, the number of teeth of the first input gear 21 is 10, the number of teeth of the second input gear 22 is 77, the number of teeth of the sun gear 25 is 27, the number of teeth of the planet gear 27 is 18, the number of internal teeth of the ring gear 26 is 63, and the number of external teeth of the ring gear 26 is 77. The number of teeth of each gear is not limited to the examples above, but the relationship in the number of teeth between the gears is preferably the same as the example above.

As shown in FIG. 5, in the case where there is no switching mechanism 36, when the wheels 5 are caused to rotate in the reverse direction (the working vehicle 2 is caused to travel rearward) (i.e., when the direction of rotation of the second output shaft 16 is changed to the reverse direction) with the first motor 11 rotating in the forward direction at a constant rotation speed, it is necessary that the rotation speed in the forward direction of the second motor 12 be greater than the rotation speed of the first motor 11 (see hollow circles at the upper left portion). This is because, in order to change the direction of rotation of the second output shaft 16 to the reverse direction, it is necessary to increase the rotation speed in the forward direction of the second motor 12 to counter the rotation in the forward direction of the first motor 11.

On the contrary, as shown in FIG. 4, in the case where there is the switching mechanism 36, when the wheels 5 are caused to rotate in the reverse direction (the working vehicle 2 is caused to travel rearward) (i.e., when the direction of rotation of the second output shaft 16 is changed to the reverse direction) with the first motor 11 rotating in the forward direction at a constant rotation speed, it is not necessary that the rotation speed in the forward direction of the second motor 12 be greater than the rotation speed of the first motor 11. This is because, since the switching mechanism 36 switches the direction of rotation of the second output shaft 16 to the reverse direction, it is not necessary to increase the rotation speed in the forward direction of the second motor 12 to counter the rotation in the forward direction of the first motor 11.

FIG. 6 shows the output of the first motor 11 and the output of the second motor 12 when there is the switching mechanism 36, and shows the output of the first motor 11 and the output of the second motor 12 when there is no switching mechanism 36. The output of the first motor 11 and the output of the second motor 12 when there is the switching mechanism 36, and the output of the first motor 11 and the output of the second motor 12 when there is no switching mechanism 36, are each the output of the first motor 11 and the output of the second motor 12 necessary to obtain the same output (torque) from the second output shaft 16. FIG. 6 shows the output of the first motor 11 and the output of the second motor 12 when the direction of rotation of the second output shaft 16 is changed to the reverse direction.

As shown in FIG. 6, when there is the switching mechanism 36, the output of the second motor 12 necessary to obtain the same output from the second output shaft 16 is smaller than the case where there is no switching mechanism 36. This is because, in the case where there is the switching mechanism 36, it is possible to cause the switching mechanism 36 to switch the direction of rotation of the second output shaft 16 to the reverse direction, and therefore it is not necessary to increase the rotation speed in the forward direction of the second motor 12 to counter the rotation in the forward direction of the first motor 11, as described earlier.

As shown in FIGS. 4 and 6, in the case where the power transmission mechanism 1 includes the switching mechanism 36, the direction of rotation of the second output shaft 16 can be switched from the forward direction to the reverse direction even if the output of the second motor 12 is small. This makes it possible to reduce the size of the second motor 12, and possible to reduce the size of the power transmission mechanism 1.

Figure 7:
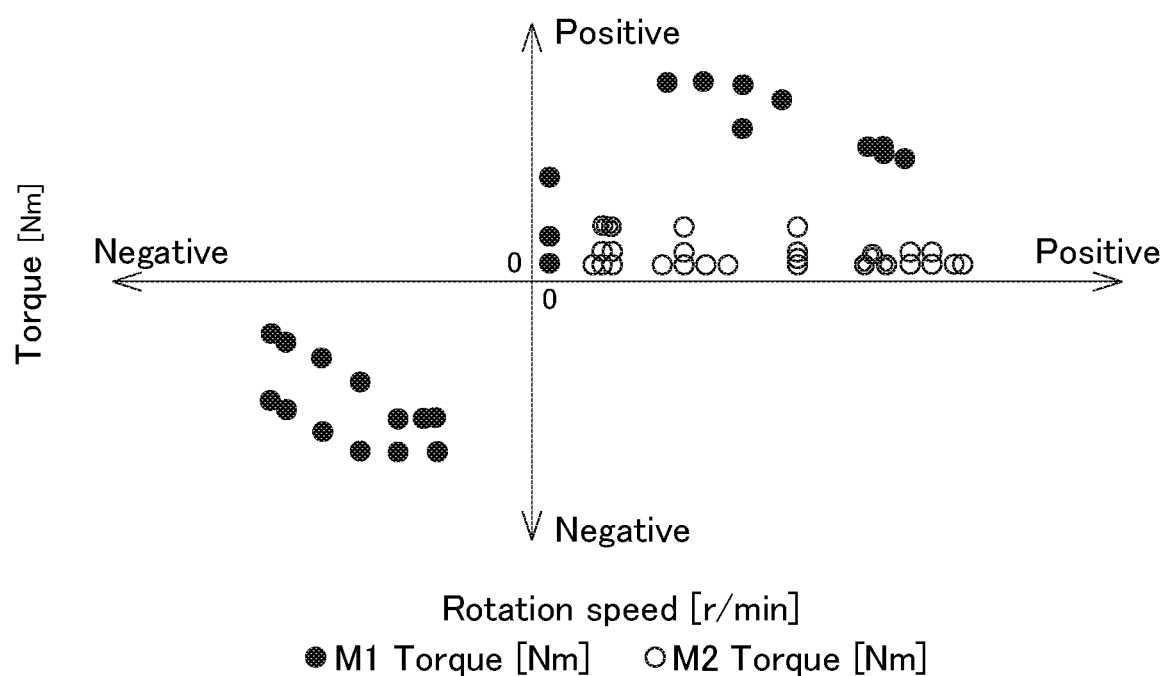
FIG. 7 shows an example of a motor NT curve showing the relationship between the torque and rotation speed of the first motor and the second motor when the power transmission mechanism of the second embodiment is driven.

FIG. 7 shows an example of a motor NT curve showing the relationship between the torque and rotation speed of the first motor 11 and the second motor 12 when the power transmission mechanism 1 of the second embodiment is driven. FIG. 7 shows a case in which there is the switching mechanism 36.

The motor NT curve shown in FIG. 7 is that obtained when the number of teeth of the first gear 29 is 20, the number of teeth of the first transmission gear 40 is 154, the number of teeth of the second transmission gear 44 is 10, the number of teeth of the third transmission gear 45 is 37, the number of teeth of the first input gear 21 is 10, the number of teeth of the second input gear 22 is 77, the number of teeth of the sun gear 25 is 27, the number of teeth of the planet gear 27 is 18, the number of internal teeth of the ring gear 26 is 63, and the number of external teeth of the ring gear 26 is 20. The number of teeth of each gear is not limited to the examples above, but the relationship in the number of teeth between the gears is preferably in accordance with the example above.

The power transmission mechanism 1 of the second embodiment, when including the switching mechanism 36, also makes it possible to reduce the output of the second motor 12, for the same reason as the power transmission mechanism 1 of the first embodiment. This makes it possible to reduce the size of the second motor 12, and also possible to reduce the size of the power transmission mechanism 1.

As illustrated in FIGS. 1, 2, and 3, the power transmission mechanism 1 includes a sensor 51 to measure the rotation speed of the second output shaft 16, and a brake 52 to stop rotation of the second output shaft 16. In the case where the second output shaft 16 is the axle 16, the working vehicle 2 includes a sensor 51 to measure the rotation speed of the wheels 5, and a brake 52 to stop rotation of the wheels 5. The sensor 51 transmits, to the controller 50, information about the measured rotation speed of the second output shaft (axle) 16. The brake 52 is, for example, a mechanical brake to mechanically stop the rotation of the wheels 5, and is actuated in response to a control signal from the controller 50.

The following description discusses the control performed by the controller 50 in stopping the rotation of the second output shaft 16. The following description assumes that the second output shaft 16 is the axle 16, and discusses the control performed by the controller 50 in stopping the rotation of the wheels 5. Note, however, that such control is applicable also to cases where the second output shaft 16 is a shaft other than the axle 16. Therefore, the wheels 5 in the following description can be replaced with the second output shaft 16. Furthermore, the control is also applicable to the control performed by the controller 50 in stopping the rotation of the first output shaft 15. In such a case, it is only necessary that the power transmission mechanism 1 be configured such that the sensor 51 measures the rotation speed of the first output shaft 15 and the brake 52 stops the rotation of first output shaft 15, and that the wheels 5 in the following description be replaced with the first output shaft (PTO shaft) 15.

Figure 8:
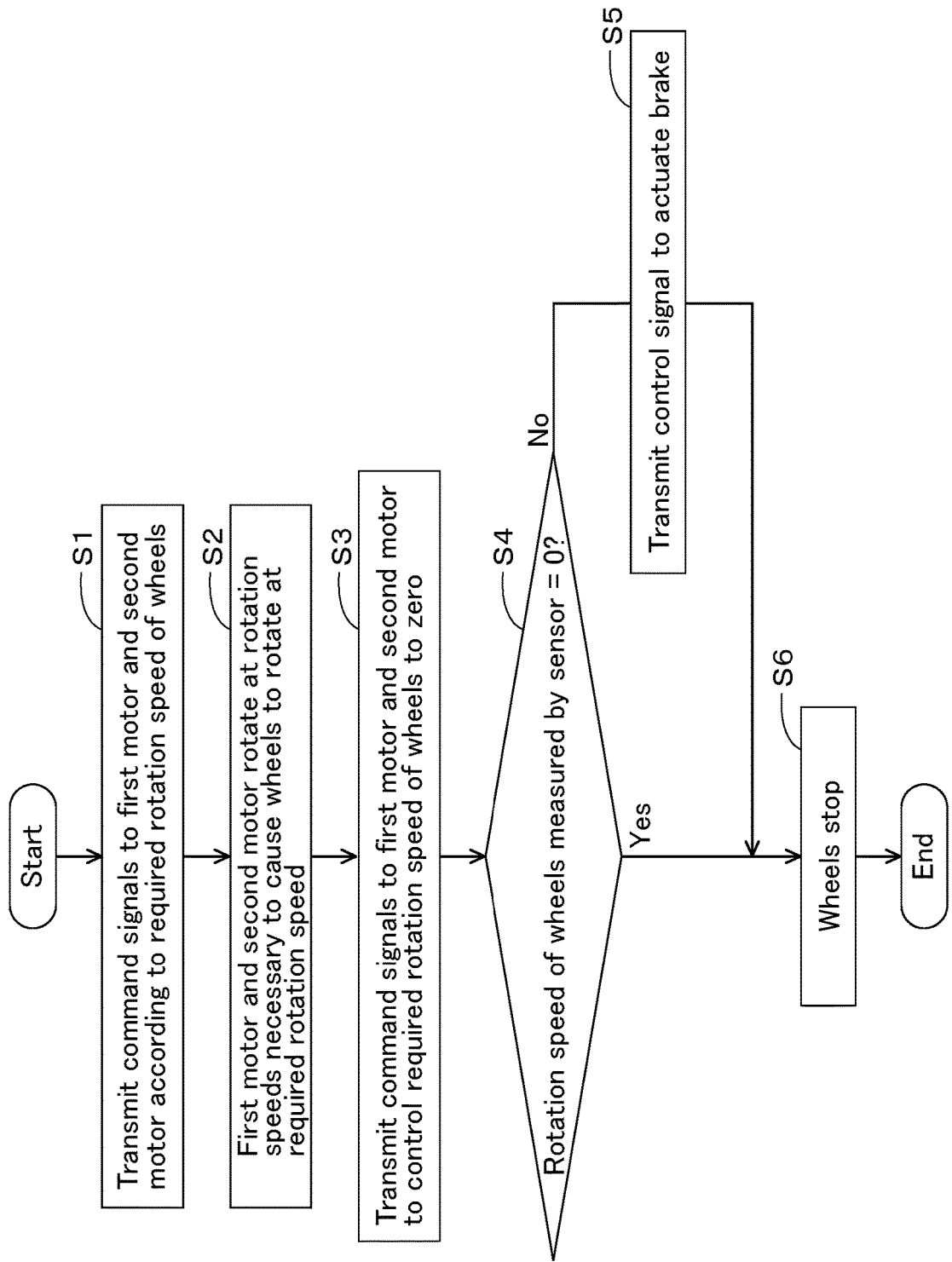
FIG. 8 is an example of a flow of control performed by a controller in stopping the rotation of wheels.

FIG. 8 is an example of a flow of control performed by the controller 50 in stopping the rotation of the wheels 5.

The controller 50 transmits, according to the required rotation speed of the wheels 5, command signals to command the first motor 11 and the second motor 12 to be driven at respective rotation speeds necessary to cause the wheels 5 to rotate at the required rotation speed (nonzero) (S1). With this, the first motor 11 and the second motor 12 rotate at the respective rotation speeds necessary to cause wheels 5 to rotate at the required rotation speed (S2).

Next, when stopping the rotation of the wheels 5, the controller 50 transmits the command signals which are to command the first motor 11 and the second motor 12 to control the required rotation speed of the wheels 5 to zero (S3). For example, when stopping the rotation of the wheels 5, the controller 50 transmits the command signals which are to command the first motor 11 and the second motor 12 to stop rotating. Alternatively, when stopping the rotation of the wheels 5, the controller 50 transmits command signals to command the first motor 11 and the second motor 12 to rotate at relative rotation speeds appropriate for the rotation speed of the wheels 5 to be zero.

After that, the controller 50 determines whether or not the rotation speed of the wheels 5 measured by the sensor 51 is zero (rpm) (S4). If the rotation speed of the wheels 5 measured by the sensor 51 is not zero (No in S4), the controller 50 transmits a control signal for actuation of the brake 52 to actuate the brake 52 (S5). This stops the wheels 5 (S6) and thus ends the control to stop the rotation of the wheels 5. If the rotation speed of the wheels 5 measured by the sensor 51 is zero (Yes in S4), because the wheels 5 are already stopped (S5), the control to stop the rotation of the wheels 5 ends.

Because the power transmission mechanism 1 uses the planetary gear mechanism 20, there are cases in which, even if the controller 50 transmits command signals to command the first motor 11 and the second motor 12 to rotate at rotation speeds necessary to cause the wheels 5 to stop, the rotation of the wheels 5 cannot be stopped completely. In other words, there are cases in which, even if the rotation speeds of the first motor 11 and the second motor 12 are adjusted to control the rotation speed of the second output shaft 16 to zero, the rotation speed cannot be maintained at zero due to differences in rotation speed.

To address this, as described earlier, when stopping the rotation of the wheels 5, the controller 50 transmits command signals to the first motor 11 and the second motor 12 to command them to control the required rotation speed of the wheels 5 to zero, and then, if the rotation speed of the wheels 5 measured by the sensor 51 is not zero, actuates the brake 52. Specifically, in the case where the required rotation speed of the wheels 5 is zero (when stopping the wheels 5), if the controller 50 has transmitted command signals to the first motor 11 and the second motor 12 to control the required rotation speed to zero but the rotation speed of the wheels 5 measured by the sensor 51 is not zero, the controller 50 transmits a command signal for actuation of the brake 52 to the brake 52 to actuate the brake 52. This makes it possible to reliably stop the wheels 5. The wheels 5 can be stopped even when the first motor 11 and/or the second motor 12 continue(s) rotating. Thus, it is also possible to stop the second output shaft 16 and the wheels 5 with the first output shaft 15 rotating.

The power transmission mechanism 1 of each of the foregoing embodiments is capable of efficiently distributing power introduced from a plurality of motors (first motor 11, second motor 12) into the planetary gear mechanism 20 onto a plurality of output shafts (first output shaft 15, second output shaft 16) having different required rotation speeds. It is also possible to reduce the sizes of the motors as compared to cases where motors producing different outputs necessary for respective loads (first driven portion 23, second driven portion 24) are provided for the respective loads. It is also possible to freely control the rotation speed of a plurality of output shafts (first output shaft 15, second output shaft 16). Furthermore, the power transmission mechanism 1 is more efficient than power transmission mechanisms using hydraulic mechanism(s).

Furthermore, with the power transmission mechanism 1 of each of the foregoing embodiments, it is possible to generate electricity by reducing the rotation speed of the first motor 11 and/or the second motor 12 (by reducing speed). Thus, the power transmission mechanism 1 of each of the foregoing embodiments can be used as an electric generator by reducing the rotation speed of the first motor 11 and/or the second motor 12.

The configurations and effects of the power transmission mechanisms 1 and the working vehicles 2 according to preferred embodiments of the present invention are summarized as follows.

A power transmission mechanism 1 according to an aspect of the present invention includes a first motor 11, a second motor 12, a first input shaft 13 to which power is transmitted from the first motor 11, a second input shaft 14 to which power is transmitted from the second motor 12, a first output shaft 15 to transmit power to a first driven portion 23, a second output shaft 16 to transmit power to a second driven portion 24, and a transmission mechanism 17 which includes a planetary gear mechanism 20 to receive power from the first input shaft 13 and the second input shaft 14, and is operable to send power from the first input shaft 13 and the second input shaft 14 to the first output shaft 15 and the second output shaft 16.

With the configuration, power introduced from a plurality of motors (first motor 11, second motor 12) into the planetary gear mechanism 20 can be taken out through a plurality of output shafts (first output shaft 15, second output shaft 16), and therefore it is possible to provide a power transmission mechanism 1 which makes it possible to efficiently drive a plurality of loads (first driven portion 23, second driven portion 24).

The power transmission mechanism 1 may further include an interrupting mechanism 35 operable to interrupt power transmission from the first output shaft 15 to the first driven portion 23.

With the configuration, it is possible, when it is not necessary to send power to the first output shaft 15, to cause the interrupting mechanism 35 to interrupt the transmission of power sent from the planetary gear mechanism 20 via the first output shaft 15 to the first driven portion 23.

The power transmission mechanism 1 may further include a switching mechanism 36 operable to change a direction of rotation of the second output shaft 16.

With the configuration, the direction of rotation of the second output shaft 16 can be changed by the switching mechanism 36, making it unnecessary to change the direction of rotational power sent out from the planetary gear mechanism 20 when changing the direction of rotation of the second output shaft 16. This makes it unnecessary to use a high-power motor to change the direction of rotation of the second output shaft 16, making it possible to reduce the size of the motor.

The second motor 12 may be operable to, when the direction of rotation of the second output shaft 16 is changed from a forward direction to a reverse direction, introduce, into the planetary gear mechanism 20, rotational power to counter rotational power that is introduced into the planetary gear mechanism 20 by driving the first motor 11 to rotate the second output shaft 16 in the forward direction.

With the configuration, it is possible to cause the second motor 12 to counter at least a portion of the power that is introduced into the planetary gear mechanism 20 by driving the first motor 11 to rotate the second output shaft 16 in the forward direction, making it possible to appropriately adjust the magnitude and direction of the rotational power sent out from the planetary gear mechanism 20.

The power transmission mechanism 1 may be configured such that, when the direction of rotation of the second output shaft 16 is changed from the forward direction to the reverse direction, the direction of rotation of the second output shaft 16 is changed by the switching mechanism 36 from the forward direction to the reverse direction to reduce the rotational power introduced to counter the rotational power from the first motor 11 as compared to a case where the direction of rotation of the second output shaft 16 is not changed by the switching mechanism 36.

With the configuration, since the switching mechanism 36 performs switching of directions, it is possible to change the direction of rotation of the second output shaft 16 from the forward direction to the reverse direction without having to use a high-power second motor 12. This makes it possible to use a low-power second motor 12, and thus possible to reduce the size of the second motor 12.

The second motor 12 may be a low-power, small motor as compared to the first motor 11.

The configuration makes it possible to reduce the size and cost of the power transmission mechanism 1.

The first motor 11 may be operable to rotate at a constant rotation speed. The second motor 12 may be operable to rotate at a rotation speed that varies depending on a required rotation speed of the second output shaft 16.

With the configuration, the second output shaft 16 can be rotated at a required rotation speed by changing the rotation speed of the second motor 12 without changing the rotation speed of the first motor 11, and therefore it is possible to easily control rotation speed. The configuration is suitable for power transmission mechanisms of the first embodiment and the third embodiment.

The first motor 11 and the second motor 12 rotate at speeds that vary depending on a required rotation speed of the first output shaft 15 and a required rotation speed of the second output shaft 16.

The configuration makes it possible to control the rotation speed of the first output shaft 15 and the second output shaft 16 in a fine-tuned manner. The configuration is suitable for power transmission mechanisms of the second embodiment.

The planetary gear mechanism 20 may include a sun gear 25 to receive power from the first input shaft 13, a ring gear 26 including internal teeth and external teeth and being operable to send power to the second output shaft 16 from the external teeth, a planet gear 27 to mesh with the internal teeth and the sun gear 25, and a planet carrier 28 to support the planet gear 27 and receive power from the second input shaft 14.

With the configuration, it is possible to introduce power from the first input shaft 13 into the sun gear 25, introduce power from the second input shaft 14 into the planet carrier 28, and send power from the ring gear 26 to the second output shaft 16. This makes it possible to efficiently send, to the second output shaft 16, the power introduced from the first input shaft 13 and the second input shaft 14.

The planetary gear mechanism 20 may include a ring gear 26 including internal teeth and external teeth and being operable to receive power from the first input shaft 13 at the external teeth and send power to the second output shaft 16 from the external teeth, a sun gear 25 to receive power from the second input shaft 14, a planet gear 27 to mesh with the internal teeth and the sun gear 25, and a planet carrier 28 to support the planet gear 27 and send power to the first output shaft 15.

With the configuration, it is possible to introduce power from the first input shaft 13 into the ring gear 26, introduce power from the second input shaft 14 into the sun gear 25, send power from the planet carrier 28 to the first output shaft 15, and send power from the ring gear 26 to the second output shaft 16. This makes it possible to efficiently send, to the second output shaft 16, the power introduced from the first input shaft 13 and the second input shaft 14.

The planetary gear mechanism 20 may include a ring gear 26 including internal teeth and external teeth and being operable to receive power from the first input shaft 13 at the external teeth and send power to the first output shaft 15 from the external teeth, a sun gear 25 to receive power from the second input shaft 14, a planet gear 27 to mesh with the internal teeth and the sun gear 25, and a planet carrier 28 to support the planet gear 27 and send power to the second output shaft 16.

With the configuration, it is possible to introduce power from the first input shaft 13 into the ring gear 26, introduce power from the second input shaft 14 into the sun gear 25, send power from the planet carrier 28 to the second output shaft 16, and send power from the ring gear 26 to the first output shaft 15. This makes it possible to efficiently send, to the second output shaft 16, the power introduced from the first input shaft 13 and the second input shaft 14.

The transmission mechanism 17 may include a first transmission portion 31 to transmit power from the first input shaft 13 to the first output shaft 15 such that the power from the first input shaft 13 does not pass through the planetary gear mechanism 20. The interrupting mechanism 35 may be operable to interrupt power transmission from the first transmission portion 31 via the first output shaft 15 to the first driven portion 23.

The configuration makes it possible to allow power from the first input shaft 13 to be transmitted by the first transmission portion 31 to the first output shaft 15 without the effects of the planetary gear mechanism 20, and possible to cause the interrupting mechanism 35 to interrupt the transmission of power from the first transmission portion 31 via the first output shaft 15 to the first driven portion 23.

The transmission mechanism 17 may include a first transmission portion 31 to transmit power from the planetary gear mechanism 20 to the first output shaft 15. The interrupting mechanism 35 may be operable to interrupt power transmission from the first transmission portion 31 via the first output shaft 15 to the first driven portion 23.

The configuration makes it possible to allow power from the planetary gear mechanism 20 to be transmitted by the first transmission portion 31 to the first output shaft 15, and possible to cause the interrupting mechanism 35 to interrupt the transmission of power from the first transmission portion 31 via the first output shaft 15 to the first driven portion 23.

The transmission mechanism 17 may include a second transmission portion 37 to transmit power from the planetary gear mechanism 20 to the second output shaft 16. The switching mechanism 36 may be included in the second transmission portion 37.

The configuration makes it possible to allow power from the planetary gear mechanism 20 to be transmitted by the second transmission portion 37 to the second output shaft 16, and possible to easily and reliably change the direction of rotation of the second output shaft 16 using the switching mechanism 36 in the second transmission portion 37.

The power transmission mechanism 1 may be a power transmission mechanism for installation in a working vehicle 2. The first driven portion 23 may be a working device 7 attached to the working vehicle 2. The second driven portion 24 may be a traveling device 4 included in the working vehicle 2.

With the configuration, it is possible to efficiently drive, with the power transmission mechanism 1, the working device 7 attached to the working vehicle 2 and the traveling device 4 included in the working vehicle 2.

The first output shaft 15 may be a PTO shaft 15 to which the working device 7 is connected. The second output shaft 16 may be an axle 16 to which one or more wheels 5 of the traveling device 4 are connected.

With the configuration, it is possible to efficiently drive, with the power transmission mechanism 1, the PTO shaft 15 to which the working device 7 is connected and the axle 16 to which the wheels 5 of the traveling device 4 are connected.

A working vehicle 2 may include the power transmission mechanism 1 according to the above-described aspect.

The configuration makes it possible to provide a working vehicle 2 which achieves the effects achieved by the power transmission mechanism 1 according to the above-described aspect.

A power transmission mechanism 1 according to another aspect of the present invention is a power transmission mechanism for installation in a working vehicle 2 including a traveling device 4 and a working device 7, the power transmission mechanism 1 including a first motor 11, a second motor 12, and a transmission mechanism 17 which includes a planetary gear mechanism 20 to receive power from the first motor 11 and the second motor 12, and is operable to send power from the first motor 11 and/or the second motor 12 to the working device 7.

With the configuration, the power transmission mechanism 1 for installation in the working vehicle 2 including the traveling device 4 and the working device 7 makes it possible to efficiently drive the working device 7 using a plurality of motors (first motor 11, second motor 12).

The planetary gear mechanism 20 may be operable to send the received power to the traveling device 4.

With the configuration, the power transmission mechanism 1 for installation in the working vehicle 2 including the traveling device 4 and the working device 7 makes it possible to efficiently drive the traveling device 4 and the working device 7 using a plurality of motors (first motor 11, second motor 12).

The power transmission mechanism 1 may include a controller 50 to control operation of the first motor 11 and the second motor 12. The controller 50 may be configured or programmed to change a difference between a rotation speed of the first motor 11 and a rotation speed of the second motor 12 to change output from the planetary gear mechanism 20.

The configuration makes it possible to easily and smoothly change the output from the planetary gear mechanism 20 steplessly.

The controller 50 may be configured or programmed to keep the rotation speed of the first motor 11 constant, and change the rotation speed of the second motor 12 depending on output necessary for the traveling device 4.

With the configuration, the second output shaft 16 can be rotated at a required rotation speed by the controller 50 changing the rotation speed of the second motor 12, making it possible to easily control rotation speed. The configuration is suitable for power transmission mechanisms of the first embodiment and the third embodiment.

The controller 50 may be configured or programmed to change the rotation speed of the first motor 11 and the rotation speed of the second motor 12 depending on output necessary for the working device 7 and output necessary for the traveling device 4.

With the configuration, the output of the working device 7 and the traveling device 4 can be controlled by the controller 50 in a fine-tuned manner. The configuration is suitable for power transmission mechanisms of the second embodiment.

The planetary gear mechanism 20 may include a sun gear 25 to receive power from the first motor 11, a ring gear 26 including internal teeth and external teeth and being operable to send power to the traveling device 4 from the external teeth, a planet gear 27 to mesh with the internal teeth and the sun gear 25, and a planet carrier 28 to support the planet gear 27 and receive power from the second motor 12.

With the configuration, it is possible to introduce power from the first motor 11 into the sun gear 25, introduce power from the second motor 12 into the planet carrier 28, and send power from the ring gear 26 to the traveling device 4. This makes it possible to efficiently send, to the traveling device 4, the power introduced from the first motor 11 and the second motor 12.

The planetary gear mechanism 20 may include a ring gear 26 including internal teeth and external teeth and being operable to receive power from the first motor 11 at the external teeth and transmit power to the traveling device 4 from the external teeth, a sun gear 25 to receive power from the second motor 12, a planet gear 27 to mesh with the internal teeth and the sun gear 25, and a planet carrier 28 to support the planet gear 27 and send power to the working device 7.

With the configuration, it is possible to introduce power from the first motor 11 into the ring gear 26, introduce power from the second motor 12 into the sun gear 25, send power from the planet carrier 28 to the working device 7, and send power from the ring gear 26 to the traveling device 4. This makes it possible to efficiently send, to the traveling device 4 and the working device 7, the power introduced from the first motor 11 and the second motor 12.

The planetary gear mechanism 20 may include a ring gear 26 including internal teeth and external teeth and being operable to receive power from the first motor 11 at the external teeth and send power to the working device 7 from the external teeth, a sun gear 25 to receive power from the second motor 12, a planet gear 27 to mesh with the internal teeth and the sun gear 25, and a planet carrier 28 to support the planet gear 27 and send power to the traveling device 4.

With the configuration, it is possible to introduce power from the first motor 11 into the ring gear 26, introduce power from the second motor 12 into the sun gear 25, send power from the planet carrier 28 to the traveling device 4, and send power from the ring gear 26 to the working device 7. This makes it possible to efficiently send, to the traveling device 4 and the working device 7, the power introduced from the first motor 11 and the second motor 12.

The power transmission mechanism 1 may further include a first input shaft 13 to transmit power from the first motor 11 to the planetary gear mechanism 20, a second input shaft 14 to transmit power from the second motor 12 to the planetary gear mechanism 20, a first output shaft 15 to send power from the transmission mechanism 17 to the working device 7, and a second output shaft 16 to send power from the transmission mechanism 17 to the traveling device 4. The first output shaft 15 may be a PTO shaft 15 to which the working device 7 is connected. The second output shaft 16 may be an axle 16 to which one or more wheels 5 of the traveling device 4 are connected.

With the configuration, it is possible to send power from the PTO shaft 15 which is the first output shaft 15 to the working device 7, and send power from the axle 16 which is the second output shaft 16 to the traveling device 4.

The power transmission mechanism 1 may further include an interrupting mechanism 35 operable to interrupt power transmission from the first output shaft 15 to the working device 7.

With the configuration, it is possible, when it is not necessary to send power from the first output shaft 15 to the working device 7, to cause the interrupting mechanism 35 to interrupt the transmission of power sent from the planetary gear mechanism 20 via the first output shaft 15 to the working device 7, easily and reliably.

The power transmission mechanism 1 may further include a switching mechanism 36 operable to change a direction of rotation of the second output shaft 16.

With the configuration, the direction of rotation of the axle 16 which is the second output shaft 16 can be changed by the switching mechanism 36, making it unnecessary to change the direction of rotational power sent out from the planetary gear mechanism 20 when changing the direction of rotation of the wheels 5. This makes it unnecessary to use a high-power motor to change the direction of rotation of the wheels 5, making it possible to reduce the size of the motor.

A working vehicle 2 may include the power transmission mechanism 1 according to the above-described another aspect.

The configuration makes it possible to provide a working vehicle 2 which achieves the effects achieved by the power transmission mechanism 1 according to the above-described another aspect.

A power transmission mechanism 1 according to a further aspect of the present invention includes a first motor 11, a second motor 12, a planetary gear mechanism 20 to receive power from the first motor 11 and the second motor 12 and send the received power to an output shaft (second output shaft 16), a controller 50 to transmit, according to a required rotation speed of the output shaft (second output shaft 16), command signals to command the first motor 11 and the second motor 12 to be driven at rotation speeds necessary to cause the output shaft (second output shaft 16) to rotate at the required rotation speed, a sensor 51 to measure a rotation speed of the output shaft (second output shaft 16), and a brake 52 to stop rotation of the output shaft (second output shaft 16), wherein the controller 50 is configured or programmed to, when the rotation of the output shaft (second output shaft 16) is to be stopped, transmit the command signals to control the required rotation speed to zero, and then actuate the brake 52 if the rotation speed measured by the sensor 51 is not zero.

With the configuration, when the controller 50 stops the rotation of the output shaft (second output shaft 16), if the controller 50 has transmitted command signals to control the required rotation speed to zero but the rotation speed measured by the sensor 51 is not zero, the brake 52 is actuated to reliably stop the rotation of the output shaft (second output shaft 16). This makes it possible to reliably stop the rotation of the output shaft (second output shaft 16) in the power transmission mechanism 1 configured such that the planetary gear mechanism 20 receives power from a plurality of motors (first motor 11, second motor 12) and sends power to the output shaft (second output shaft 16).

A working vehicle 2 includes a vehicle body 3, wheels 5 to support the vehicle body 3 such that the vehicle body 3 is allowed to travel, a first motor 11, a second motor 12, a planetary gear mechanism 20 to receive power from the first motor 11 and the second motor 12 and send the received power to an axle 16 of the wheels 5, a controller 50 to transmit, according to a required rotation speed of the wheels 5, command signals to command the first motor 11 and the second motor 12 to be driven at rotation speeds necessary to cause the wheels 5 to rotate at the required rotation speed, a sensor 51 to measure a rotation speed of the wheels 5, and a brake 52 to stop rotation of the wheels 5, wherein the controller 50 is configured or programmed to, when the rotation of the wheels 5 is to be stopped, transmit the command signals to control the required rotation speed to zero, and then actuate the brake 52 if the rotation speed measured by the sensor 51 is not zero.

With the configuration, when the controller 50 stops the rotation of the wheels 5, if the controller 50 has transmitted command signals to control the required rotation speed to zero but the rotation speed measured by the sensor 51 is not zero, the brake 52 is actuated to reliably stop the rotation of the wheels 5. This makes it possible to reliably stop the rotation of the wheels 5 in the power transmission mechanism 1 configured such that the planetary gear mechanism 20 receives power from a plurality of motors (first motor 11, second motor 12) and sends power to the axle 16 of the wheels 5.

The controller 50 may be configured or programmed to, when the rotation of the wheels 5 is to be stopped, transmit one of the command signals that is a command signal to command the first motor 11 or the second motor 12 to stop rotating.

With the configuration, it is possible, by the controller 50 transmitting a command signal to the first motor 11 or the second motor 12 to stop rotating, to smoothly stop the rotation of the wheels 5. Since one of the first and second motors 11 and 12 is stopped and the other continues to be driven, it is possible to stop the rotation of the wheels 5 with element(s) other than the wheels 5 (such as the working device 7) being driven.

The working vehicle 2 may further include a switching mechanism 36 operable to change a direction of rotation of the axle 16.

With the configuration, the direction of rotation of the axle 16 can be changed using the switching mechanism 36, making it unnecessary to change the direction of rotational power sent out from the planetary gear mechanism 20 when changing the direction of rotation of the wheels 5. This makes it unnecessary to use a high-power motor to change the direction of rotation of the wheels 5.

The working vehicle 2 may further include a PTO shaft 15 to drive a working device 7 attached to the vehicle body 3, a first input shaft 13 to which power is transmitted from the first motor 11, and a second input shaft 14 to which power is transmitted from the second motor 12. The planetary gear mechanism 20 may be operable to receive power from the first input shaft 13 and the second input shaft 14, and sends the received power to the axle 16 and the PTO shaft 15.

With the configuration, in the working vehicle 2, since power from the first motor 11 and the second motor 12 is introduced into the planetary gear mechanism 20, the introduced power can be sent to the axle 16 and the PTO shaft 15. This makes it possible to efficiently drive the axle 16 and the PTO shaft 15.

The planetary gear mechanism 20 may include a ring gear 26 including internal teeth and external teeth and being operable to transmit power to the axle 16 from the external teeth, a sun gear 25 to receive power from the first input shaft 13, a planet gear 27 to mesh with the internal teeth and the sun gear 25, and a planet carrier 28 to support the planet gear 27 and receive power from the second input shaft 14. Power from the first input shaft 13 may be transmitted to the PTO shaft 15 without passing through the planetary gear mechanism 20.

The configuration makes it possible to introduce power from the first input shaft 13 into the sun gear 25, send power from the first input shaft 13 to the PTO shaft 15 such that the power does not pass through the planetary gear mechanism 20, and send power from the ring gear 26 to the axle 16. This makes it possible to efficiently send, to the PTO shaft 15 and the axle 16, power introduced from the first input shaft 13 and the second input shaft 14.

The planetary gear mechanism 20 may include a ring gear 26 including internal teeth and external teeth and being operable to receive power from the first input shaft 13 at the external teeth and transmit power to the axle 16 from the external teeth, a sun gear 25 to receive power from the second input shaft 14, a planet gear 27 to mesh with the internal teeth and the sun gear 25, and a planet carrier 28 to support the planet gear 27 and send power to the PTO shaft 15.

The configuration makes it possible to introduce power from the first input shaft 13 into the ring gear 26, introduce power from the second input shaft 14 to the sun gear 25, send power from the planet carrier 28 to the PTO shaft 15, and send power from the ring gear 26 to the axle 16. This makes it possible to efficiently send, to the PTO shaft 15 and the axle 16, power introduced from the first input shaft 13 and the second input shaft 14.

The planetary gear mechanism 20 may include a ring gear 26 including internal teeth and external teeth and being operable to receive power from the first input shaft 13 at the external teeth and transmit power to the PTO shaft 15 from the external teeth, a sun gear 25 to receive power from the second input shaft 14, a planet gear 27 to mesh with the internal teeth and the sun gear 25, and a planet carrier 28 to support the planet gear 27 and send power to the axle 16.

The configuration makes it possible to introduce power from the first input shaft 13 into the ring gear 26, introduce power from the second input shaft 14 to the sun gear 25, send power from the planet carrier 28 to the axle 16, and send power from the ring gear 26 to the PTO shaft 15. This makes it possible to efficiently send, to the PTO shaft 15 and the axle 16, power introduced from the first input shaft 13 and the second input shaft 14.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power transmission mechanism comprising:
    a first motor;
    a second motor;
    a first input shaft to which power is transmitted from the first motor;
    a second input shaft to which power is transmitted from the second motor;
    a first output shaft to transmit power to a first driven portion;
    a second output shaft to transmit power to a second driven portion;
    a transmission mechanism which:
        includes a planetary gear mechanism to receive power from the first input shaft and the second input shaft; and
        is operable to send power from the first input shaft and the second input shaft to the first output shaft and the second output shaft; and
    an interrupting mechanism operable to interrupt power transmission from the first output shaft to the first driven portion; wherein
    the power transmission mechanism is configured such that power from the first input shaft and power from the second input shaft are introduced into the planetary gear mechanism which is a single planetary gear mechanism including a single sun gear and a single ring gear.

2. The power transmission mechanism according to claim 1, further comprising a switching mechanism operable to change a direction of rotation of the second output shaft.

3. The power transmission mechanism according to claim 2, wherein the second motor is operable to, when the direction of rotation of the second output shaft is to be changed from a forward direction to a reverse direction, introduce, into the planetary gear mechanism, rotational power to counter rotational power that is introduced into the planetary gear mechanism by driving the first motor to rotate the second output shaft in the forward direction.

4. The power transmission mechanism according to claim 3, wherein the power transmission mechanism is configured such that, when the direction of rotation of the second output shaft is to be changed from the forward direction to the reverse direction, the direction of rotation of the second output shaft is changed by the switching mechanism from the forward direction to the reverse direction to reduce the rotational power introduced to counter the rotational power from the first motor as compared to a case where the direction of rotation of the second output shaft is not changed by the switching mechanism.

5. The power transmission mechanism according to claim 2, wherein the second motor is a low-power, small motor as compared to the first motor.

6. The power transmission mechanism according to claim 1, wherein:

the first motor is operable to rotate at a constant rotation speed; and the second motor is operable to rotate at a rotation speed that varies depending on a required rotation speed of the second output shaft.

7. The power transmission mechanism according to claim 1, wherein the first motor and the second motor are operable to rotate at speeds that vary depending on a required rotation speed of the first output shaft and a required rotation speed of the second output shaft.

8. The power transmission mechanism according to claim 1, wherein the planetary gear mechanism includes:
the sun gear to receive power from the first input shaft;
the ring gear including internal teeth and external teeth and being operable to send power to the second output shaft from the external teeth;
a planet gear to mesh with the internal teeth and the sun gear; and
a planet carrier to support the planet gear and receive power from the second input shaft.

9. The power transmission mechanism according to claim 1, wherein the planetary gear mechanism includes:
the ring gear including internal teeth and external teeth and being operable to receive power from the first input shaft at the external teeth and send power to the second output shaft from the external teeth;
the sun gear to receive power from the second input shaft;
a planet gear to mesh with the internal teeth and the sun gear; and
a planet carrier to support the planet gear and send power to the first output shaft.

10. The power transmission mechanism according to claim 1, wherein the planetary gear mechanism includes:
the ring gear including internal teeth and external teeth and being operable to receive power from the first input shaft at the external teeth and send power to the first output shaft from the external teeth;
the sun gear to receive power from the second input shaft;
a planet gear to mesh with the internal teeth and the sun gear; and
a planet carrier to support the planet gear and send power to the second output shaft.

11. The power transmission mechanism according to claim 1, wherein:
the transmission mechanism includes a first transmission portion to transmit power from the first input shaft to the first output shaft such that the power from the first input shaft does not pass through the planetary gear mechanism; and
the interrupting mechanism is operable to interrupt power transmission from the first transmission portion via the first output shaft to the first driven portion.

12. The power transmission mechanism according to claim 1, wherein:
the transmission mechanism includes a first transmission portion to transmit power from the planetary gear mechanism to the first output shaft; and
the interrupting mechanism is operable to interrupt power transmission from the first transmission portion via the first output shaft to the first driven portion.

13. The power transmission mechanism according to claim 2, wherein:
the transmission mechanism includes a second transmission portion to transmit power from the planetary gear mechanism to the second output shaft; and
the switching mechanism is included in the second transmission portion.

14. The power transmission mechanism according to claim 1, which is a power transmission mechanism for installation in a working vehicle, wherein:
the first driven portion is a working device attached to the working vehicle; and
the second driven portion is a traveling device included in the working vehicle.

15. The power transmission mechanism according to claim 14, wherein:
the first output shaft is a PTO shaft to transmit power to the working device; and
the second output shaft is an axle to which one or more wheels of the traveling device are connected.

16. A working vehicle comprising the power transmission mechanism according to claim 14.

17. A power transmission mechanism comprising:
a first motor;
a second motor;
a first input shaft to which power is transmitted from the first motor;
a second input shaft to which power is transmitted from the second motor;
a first output shaft to transmit power to a first driven portion;
a second output shaft to transmit power to a second driven portion;
a transmission mechanism which:
includes a planetary gear mechanism to receive power from the first input shaft and the second input shaft; and
is operable to send power from the first input shaft and the second input shaft to the first output shaft and the second output shaft; and
a switching mechanism operable to change a direction of rotation of the second output shaft; wherein
the power transmission mechanism is configured such that power from the first input shaft and power from the second input shaft are introduced into the planetary gear mechanism which is a single planetary gear mechanism including a single sun gear and a single ring gear; and
the second motor is operable to, when the direction of rotation of the second output shaft is to be changed from a forward direction to a reverse direction, introduce, into the planetary gear mechanism, rotational power to counter rotational power that is introduced into the planetary gear mechanism by driving the first motor to rotate the second output shaft in the forward direction.

18. The power transmission mechanism according to claim 17, wherein the switching mechanism is a mechanism in which the direction of rotation of the second output shaft is changed by changing a connection of gears.

19. The power transmission mechanism according to claim 1, wherein
the interrupting mechanism includes a clutch;
engagement of the clutch allows power transmission from the first output shaft to the first driven portion; and
disengagement of the clutch interrupts the power transmission from the first output shaft to the first driven portion.

20. A power transmission mechanism comprising:
a first motor;
a second motor;
a first input shaft to which power is transmitted from the first motor;

a second input shaft to which power is transmitted from the second motor;
a first output shaft to transmit power to a first driven portion;
a second output shaft to transmit power to a second driven portion;
a transmission mechanism which:
  includes a planetary gear mechanism to receive power from the first input shaft and the second input shaft; and
  is operable to send power from the first input shaft and the second input shaft to the first output shaft and the second output shaft; and
a switching mechanism operable to change a direction of rotation of the second output shaft; wherein
the power transmission mechanism is configured such that power from the first input shaft and power from the second input shaft are introduced into the planetary gear mechanism which is a single planetary gear mechanism including a single sun gear and a single ring gear;
the second motor is operable to, when the direction of rotation of the second output shaft is to be changed from a forward direction to a reverse direction, introduce, into the planetary gear mechanism, rotational power to counter rotational power that is introduced into the planetary gear mechanism by driving the first motor to rotate the second output shaft in the forward direction; and
the power transmission mechanism is configured such that, when the direction of rotation of the second output shaft is to be changed from the forward direction to the reverse direction, the direction of rotation of the second output shaft is changed by the switching mechanism from the forward direction to the reverse direction to reduce the rotational power introduced to counter the rotational power from the first motor as compared to a case where the direction of rotation of the second output shaft is not changed by the switching mechanism.

* * * * *